United States Patent
Hebiguchi et al.

(10) Patent No.: US 6,433,764 B1
(45) Date of Patent: *Aug. 13, 2002

(54) LIQUID CRYSTAL DISPLAY

(75) Inventors: Hiroyuki Hebiguchi; Chae Gee Sung, both of Miyagi-ken (JP)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,264

(22) Filed: Jan. 21, 1998

(30) Foreign Application Priority Data

Jan. 23, 1997 (JP) .............................. 9-010690
Jan. 23, 1997 (JP) .............................. 9-010692

(51) Int. Cl.$^7$ ................................ G09G 3/36
(52) U.S. Cl. .......................... 345/87; 349/38
(58) Field of Search .............. 345/87, 90, 92, 345/93; 359/59; 349/43, 38

(56) References Cited

U.S. PATENT DOCUMENTS

| | | | | |
|---|---|---|---|---|
| 4,386,352 A | * | 5/1983 | Nonomura et al. | 340/784 |
| 4,646,074 A | * | 2/1987 | Hashimoto et al. | 340/718 |
| 5,151,806 A | * | 9/1992 | Kawamoto et al. | 359/59 |
| 5,250,931 A | * | 10/1993 | Misawa et al. | 345/206 |
| 5,365,079 A | * | 11/1994 | Kodaira et al. | 257/59 |
| 5,517,341 A | * | 5/1996 | Kim et al. | 359/59 |
| 5,585,951 A | * | 12/1996 | Noda et al. | 349/122 |
| 5,598,285 A | | 1/1997 | Kondo et al. | 349/39 |
| 5,610,738 A | * | 3/1997 | Sasano et al. | 349/43 |
| 5,708,484 A | * | 1/1998 | Someya et al. | 349/38 |
| 5,798,744 A | * | 8/1998 | Tanaka et al. | 345/92 |

FOREIGN PATENT DOCUMENTS

| | | |
|---|---|---|
| JP | 6-160878 | 6/1994 |
| JP | 6-273803 | 9/1994 |
| JP | 07306276 | 11/1995 |

* cited by examiner

Primary Examiner—Vijay Shankar
Assistant Examiner—Vanel Frenel
(74) Attorney, Agent, or Firm—Brinks Hofer Gilson & Lione

(57) ABSTRACT

A liquid crystal display of a lateral electric field driving system having a high viewing angle characteristic and a high aperture ratio comprises a pair of substrates disposed with a space therebetween, a liquid crystal filling up the space between the pair of substrates, a plurality of pixel electrodes formed in a plurality of pixel regions on an inner surface of one of the pair of substrates, common electrodes each for creating an electric field of a direction parallel to the inner surface of the substrate in cooperation with each of the plurality of pixel electrodes, and capacitor forming electrodes each formed over and spaced from the pixel electrode so as to form a capacitor in combination with each of the pixel electrodes.

7 Claims, 17 Drawing Sheets

OFF STATE (DARK STATE)

ON STATE (LUMINOUS STATE)

LIQUID CRYSTAL DISPLAY

BACKGROUND OF THE INVENTION

1. Field of the Invention

The present invention relates to a liquid crystal display for displaying pictures and the like, having an appropriate capacity, capable of ensuring the accurate operation of thin-film transistors and having a high aperture ratio.

2. Description of the Related Art

Because of advantages in weight reduction, device miniaturization and thickness reduction, liquid crystal displays have come into wide use. As is generally known, a twist nematic mode (TN mode) active matrix liquid crystal display, in particular, requires a relatively low driving voltage, dissipates power at a relatively low rate, and is capable of displaying pictures in high contrast and high quality.

A general TN mode liquid crystal display of this kind is formed by disposing two glass substrates each provided with a polarizer, a transparent electrode and an alignment layer opposite to each other with a space therebetween and with the respective directions of orientation of the alignment layers perpendicular to each other, and filling up the space between the two glass substrates with a twist nematic liquid crystal so that molecules of the twist nematic liquid crystal can be twisted through and angle of 90°.

Recently, the dependence of the visibility, i.e., viewing angle characteristic, of a general TN mode liquid crystal display of this kind on viewing angle has become a problem. FIG. 7 shows the viewing angle characteristic of a general TN mode liquid crystal display, in which shaded region corresponds to a viewing angle range in which contrast (CR) is 10 or above. As is obvious from FIG. 7, the visibility from lateral viewing directions of the TN mode liquid crystal display is satisfactory, the visibility from vertical viewing directions is not satisfactory, and the visibility from upper vertical viewing directions is very bad.

The applicant of the present patent application proposed a liquid crystal display element of a structure capable of solving such a problem in Japanese Patent Application No. 7-306276. In this previously proposed liquid crystal display element, spaced linear electrodes 12 and 13 of different polarities are formed only on the lower substrate 11 as shown in FIG. 8 and any electrode is not formed on an upper substrate 10 as shown in FIG. 9 instead of forming liquid crystal driving electrodes on both the upper substrate 10 and the lower substrate 11 disposed on the opposite sides of a liquid crystal layer, and a voltage is applied across the linear electrodes 12 and 13 to align liquid crystal molecules 36 in the direction of a lateral electric field created between the linear electrodes 12 and 13.

More specifically, the linear electrodes 12 are connected to a base line 14 to form a comblike electrode 16, the linear electrodes 13 are connected to a base line 15 to form a comblike electrode 17, the comblike electrodes 16 and 17 are disposed so that the linear electrodes 12 and 13 are arranged alternately at intervals, and the base lines 14 and 15 are connected to a power supply 18 and a switching device 19.

As shown in FIG. 10A, an upper alignment layer is formed on a surface of the upper substrate 10 contiguous with the liquid crystal, the upper alignment layer is treated so as to align the liquid crystal molecules 36 in the direction of the arrow β, lower alignment layer is formed on a surface of the lower substrate contiguous with the liquid crystal so as to align the liquid crystal molecules in the direction of the arrow γ parallel to the direction of the arrow β, an upper polarizer film having a polarizing direction in the direction of the arrow β in FIG. 10A is laminated to the upper substrate 10, and a lower polarizer film having a polarizing direction parallel to the direction of the arrow α is laminated to the lower substrate 11. When any voltage is not applied across the linear electrodes 12 and 13, the liquid crystal display element remains dark. When a voltage is applied across the linear electrodes 12 and 13, the liquid crystal display element turns bright.

FIGS. 12 and 13 show a configuration of an actual active matrix liquid crystal driving circuit employing the structure of a liquid crystal display provided with the foregoing linear electrodes 12 and 13.

As shown in FIGS. 12 and 13, in which only a portion of the active matrix liquid crystal driving circuit corresponding to one pixel is shown, a gate electrode 21 and spaced, parallel, linear electrodes 22 are formed by patterning a conductive film on a transparent substrate 20, such as a glass substrate, a gate insulating layer 24 is formed over the gate electrode 21 and the linear electrodes 22, and a thin-film transistor T is formed by forming a semiconductor film 26 in an area on the gate insulating layer 24 corresponding to the gate electrode 21, and forming a source electrode 27 and a drain electrode 28 on the opposite sides of the semiconductor film 26, and a second linear electrode 29 is formed by processing a conductive film in an area on the gate insulating film 24 corresponding to the middle between the first linear electrodes 22.

As shown in plan view in FIG. 12, gate lines 30 and signal lines 31 are formed on the transparent substrate 20 to define rectangular pixel regions arranged in a matrix, the gate electrode 21, i.e., a portion of the gate line 30, is formed in a corner of the pixel region, the second linear electrode 29 is extended in parallel to the signal line 31 and is connected through a capacity electrode 33 to the drain electrode 28 overlying the gate electrode 21, and the first linear electrodes 22 are extended in parallel to and on the opposite sides of the second linear electrode 29.

Ends of the first linear electrodes 22 on the side of the gate line 30 are connected to a connecting line 34 extended in parallel to the gate line 30 in the pixel region, and the other ends of the first linear electrodes 22 are connected to a common electrode 35 extended in parallel to the gate line 30. The common electrode 35 is extended in parallel to the gate line 30 through a plurality of pixel regions to apply the same voltage to the linear electrodes 22 of all the pixel regions. One end portion of the second linear electrode 29 is extended to a position over the common electrode 35, a capacity electrode 36' is formed at the end of the second linear electrode 29 so as to overlie a portion of the common electrode 35 in the pixel region, the capacity electrode 33 formed at the other end of the second linear electrode 29 overlies the connecting line 34. The capacity electrodes 33 and 36' form capacitors together with the connecting line 34 and the common electrode 35 underlying and separated by the insulating layer 24 from the capacity electrodes 33 and 36', respectively, to stabilize the operation of the thin-film transistor T when driving the liquid crystal.

Although this liquid crystal display of the foregoing configuration provided with a liquid crystal driving circuit is advantageous in its wide viewing angle, the same has a problem that its aperture ratio is liable to be small.

The capacitor consisting of the capacity electrode 33 and the connecting line 34 formed on the opposite sides of the insulating layer 24 and the capacitor consisting of the capacity electrode 36' and the common electrode 35 formed on the opposite sides of the insulating film 24 shown in FIGS. 12 and 13 need to have capacities on an appropriate level to stabilize the operation for driving the thin-film transistor T. Therefore, the common electrode 33, the connecting electrode 34, the common electrode 35 and the capacity electrode 36' must be formed in widths as shown in FIG. 14 greater than those shown in FIG. 12. If the common electrode 33, the connecting line 34, the common electrode 35 and the capacity electrode 36' are thus formed as shown in FIG. 14, the sum of the respective areas of the common electrode 33, the connecting line 34, the common electrode 35 and the capacity electrode 36' increases relative to the area of the pixel region and, consequently, the aperture ratio of the liquid crystal display is liable to be reduced.

A disadvantage attributable to a small aperture ratio may be compensated by adjusting the intensity of the backlight backlighting the liquid crystal display element of the liquid crystal display, which, however, increases the power consumption of the liquid crystal display. Therefore, such measures to compensate the disadvantage have an adverse effect on the development of a liquid crystal display capable of reducing power dissipation.

The foregoing active matrix liquid crystal display drives molecules of the liquid crystal by creating a lateral electric field and hence needs a liquid crystal driving voltage higher than that needed by a TN mode liquid crystal display, which also increases power consumption.

SUMMARY OF THE INVENTION

Accordingly, it is an object of the present invention to provide a liquid crystal display capable of achieving both the realization of a high viewing angle characteristic by a configuration for driving a liquid crystal by a lateral electric field parallel to the surface of a substrate and the stable driving of thin-film transistors, and having a large aperture ratio.

Another object of the present invention is to provide an active matrix liquid crystal display of a lateral electric field drive system having a large aperture ratio and capable of suppressing power dissipation.

According to a first aspect of the present invention, a liquid crystal display comprises a pair of substrates disposed with a space therebetween, a liquid crystal filling up the space between the pair of substrates, a plurality of pixel electrodes formed in a plurality of pixel regions on an inner surface of one of the pair of substrates, common electrodes each for creating an electric field of a direction parallel to the inner surface of the substrate in cooperation with each of the plurality of pixel electrodes, and capacitor forming electrodes each formed over and spaced from the pixel electrode so as to form a capacitor in combination with each of the pixel electrodes.

In this liquid crystal display, each of the pixel electrodes may be formed in an inner portion of each of the plurality of pixel regions, the common electrode defining each of the pixel regions may be formed opposite to the pixel electrode, and the capacitor forming electrode may be formed in an inner portion of the common electrode.

Since an electric field of a direction parallel to the surface of the substrate can be created by the common electrode and the pixel electrode formed on the substrate, the alignment of molecules of the liquid crystal can be controlled by creating and removing the electric field to select a displaying mode or a nondisplaying mode. Since the common electrode is provided with a capacitor forming electrode, the common electrode is able to form a capacitor in combination with the pixel electrode.

In this liquid crystal display, corresponding portions of the pixel electrode and the capacitor forming electrode may be formed. in the shape of a strip, and the width of the portion of the pixel electrode may be greater than that of the corresponding portion of the capacitor forming electrode.

Since the width of the portion of the pixel electrode may be greater than that of the corresponding portion of the capacitor forming electrode, the capacitor forming electrode is covered with the pixel electrode. Accordingly, an aperture ratio does not fall and the liquid crystal is unaffected by providing with the capacitor forming electrode.

In this liquid crystal display, the common electrodes may be formed on the substrate provided with the pixel electrodes, and the pixel electrodes may overlie the common electrodes, respectively.

Thus, the pixel electrodes can be disposed near the liquid crystal and a high effective voltage is available for liquid crystal driving.

According to a second aspect of the present invention, an active matrix liquid crystal display of a lateral electric field drive system comprises: a pair of transparent substrates disposed with a space therebetween; a liquid crystal filling up the space between the pair of substrates; gate lines formed so as to extend in one direction on an inner surface of one of the pair of substrates; signal lines formed on the inner surface of the same substrate so as to extend across the gate lines and to define a matrix of pixel regions serving as pixels together with the gate lines; pixel switching elements connected to the pixels and the gate lines, respectively, each pixel switching element being driven by a gate voltage applied thereto through the gate line to apply a signal voltage through the signal line to the pixel electrode; pixel electrodes formed in the pixel regions and connected to the pixel switching elements, respectively; and common lines extended in parallel to the gate lines and having common electrodes extending toward the pixel electrodes, respectively, a common voltage being applied to each common electrode to create an electric field substantially parallel to the surface of the transparent substrate in cooperation with the pixel electrode to drive molecules of the liquid crystal to display pictures.

In this active matrix liquid crystal display, the pixel electrode corresponding to each pixel has an extension extended over the gate line corresponding to the adjacent pixel, capacitors for storing the signal voltage to be applied to each pixel are formed by overlapping portions of the pixel electrode and the common electrode, and overlapping portions of the extension of the pixel electrode and the gate line corresponding to the adjacent pixel.

In this active matrix liquid crystal display, a plurality of common electrodes may be formed for each pixel, the free ends of the plurality of common electrodes may be interconnected by a connecting electrode to form the capacitor for storing the signal voltage to be applied to the pixel by overlapping portions of the connecting electrode and the pixel electrode.

In this active matrix liquid crystal display, the common voltage applied to each pixel may be varied in synchronism with the application of the gate voltage to the switching element of the same pixel.

Since the pixel electrode and the gate line of the adjacent pixel form part of the capacitor for storing the signal voltage, a necessary storage capacity can be secured even if the area of the opposite portions of the pixel electrode and the common electrode is small. Consequently, the active matrix liquid crystal display has a high aperture ratio. Although the conventional active matrix liquid crystal of a lateral electric field drive system having a low aperture ratio compensates the disadvantage attributable to the low aperture ratio by increasing the intensity of the backlight, active matrix liquid crystal display of the present invention does not need any power to enhance the lighting effect of the backlight because the same has a high aperture ratio.

An expected electric field can be created between the pixel electrode of the pixel and the common electrode without increasing the amplitude of the signal voltage greatly. Accordingly, the power consumption of a source driver which generates the signal voltage can be suppressed, and the source driver may be such as having a low withstand voltage.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
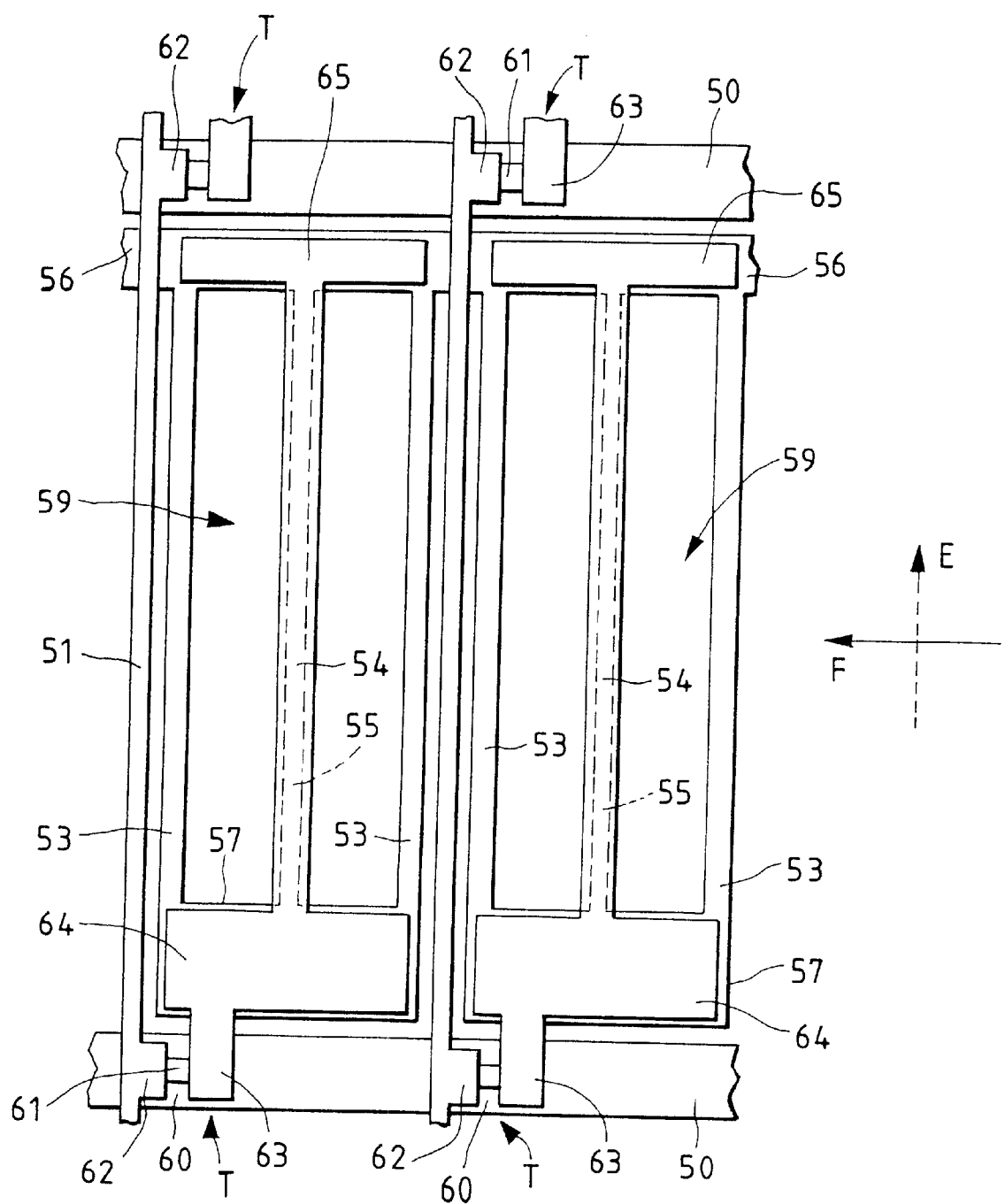
FIG. 1 is a typical plan view of an arrangement of electrodes in a liquid crystal display in a first embodiment according to the present invention.
Figure 2:
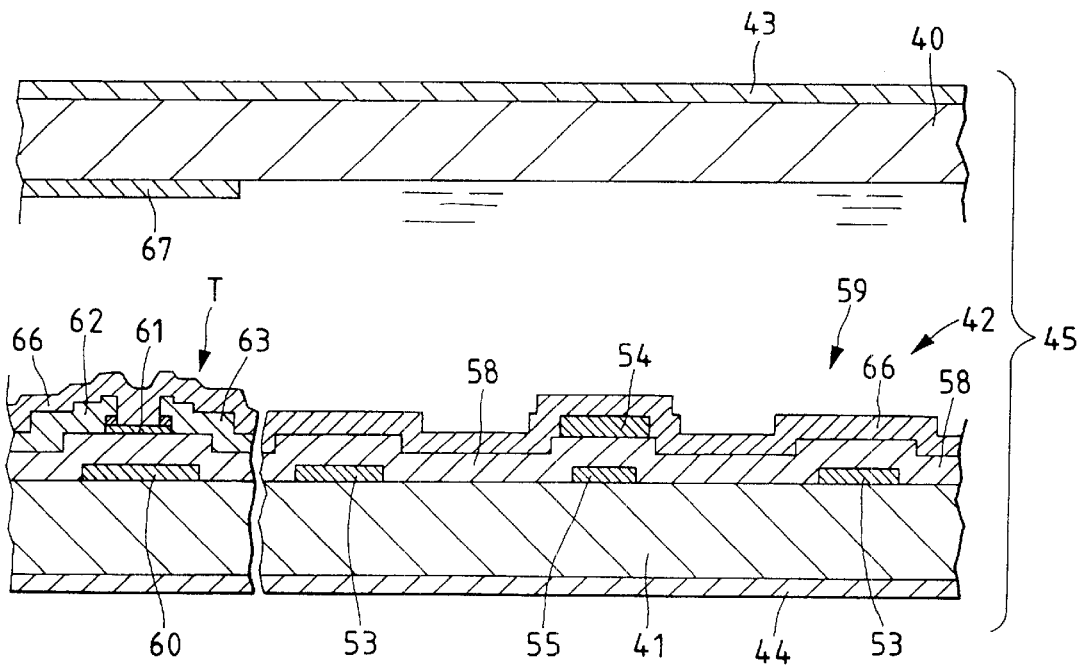
FIG. 2 is a fragmentary typical sectional view of the liquid crystal display of FIG. 1.

Referring to FIGS. 1 and 2 showing an essential portion of a liquid crystal display in a preferred embodiment according to the present invention, a liquid crystal display element 45 is fabricated by disposing a transparent upper substrate 40 and a transparent lower substrate 41, as viewed in FIG. 2, in parallel to each other so as to form a predetermined cell gap therebetween, surrounding the substrates 40 and 41 by a sealing member so as to seal the cell gap, filling a liquid crystal in the sealed cell gap between the substrates 40 and 41 to form a liquid crystal layer 42, and attaching polarizer films 43 and 44 to the outer surfaces of to the outer surfaces of the substrates 40 and 41, respectively.

Although the substrates 40 and 41 are made of transparent substrates such as glass, the marginal portion of the substrates 40 and 41 are surrounded with sealing member not shown, and the liquid crystal is stored in the space surrounded with the substrates 40, 41 and the sealing member to form the liquid crystal layer 42 in the actual construction. The substrates 40 and 41 are combined with the polarizer films 43 and 44 to constitute a liquid crystal display element 45.

In this liquid crystal display element 45 of the foregoing construction, a plurality of gate lines 50 and a plurality of signal lines 51 are formed in a grid on the lower substrate 41. Common electrodes 53 and pixel electrodes 54 are formed in parallel to each other in regions defined by the gate lines 50 and the signal lines 51.

More specifically, the plurality of parallel gate lines 50 are arranged at predetermined intervals on the lower substrate 41, common lines 56 are arranged along the gate lines 50 on the lower substrate 41 in a plane including the gate lines 50, the two linear common electrodes 53 are extended perpendicularly from the common line 56 in each of the regions defined by the gate lines 50 and the signal lines 51, and the extremities of the two common electrodes 53 are connected to a connecting line 54 at positions near the adjacent gate line 50, and a strip-shaped capacitor forming electrode 55 is disposed between the two common electrodes 53 and is connected to the common line 56 and the connecting line 57.

The numbers of the gate lines 50 and the signal lines 51 of a liquid crystal display element 45 are equal to those of the gate lines 50 and the signal lines 51 required by the liquid crystal display, and the common electrodes 53 are formed so as to define the opposite sides of the regions defined by the gate lines 50 and the signal lines 51. In FIG. 1, only a portion of the liquid crystal display element 45 including the two adjacent gate lines 50 and the two adjacent signal lines 51 is shown in a plan view; that is, the plurality of pixel electrodes 54 and the plurality of common electrodes 53 are formed on the lower substrate 41 so as to define a plurality of pixel regions 59.

An insulating layer 58 is formed over the inner surface of the lower substrate 41 so as to cover the plurality of pixel regions 59. The gate lines 50 and the signal lines 51 are formed so as to extend perpendicularly to each other in the shape of a grid in a plane on the insulating layer 58. Portions of the gate lines 50 in regions where the gate lines 50 and the signal lines 51 intersect each other serve as gate electrodes 60. A source electrode 62 and a drain electrode 63 are formed on the opposite sides of a semiconductor film 61 in a region overlying each gate electrode 60 on the insulating layer 58 to construct a thin-film transistor (switching element) T. The pixel electrode 54 is formed on the insulating layer 58 so as to overlie the capacitor forming electrode 55. Thus, the pixel electrode 54 and the capacitor forming electrode 55 formed opposite to each other with respect to the insulating layer 58 form a capacitor.

The source electrode 62 is connected to the source line 51, the drain electrode 63 is connected to a capacitor electrode 64 formed on the insulating layer 58 so as to overlie the connecting line 57, the pixel electrode 54 is extended from a middle portion of the capacitor electrode 64 in parallel to the common electrode 53, the extremity of the pixel electrode 54 is connected to a capacitor electrode 65 formed on the insulating layer 58 so as to overlie the common line 56, and a cover layer 66 is formed over the lower substrate 41 so as to cover those lines and electrodes as shown in FIG. 2.

The common line 56 is narrower than the connecting line 57, the pixel electrode 54 is narrower than the common line 56, the common electrode 53 is slightly narrower than the pixel electrode 54, and the capacitor forming electrode 55 is slightly narrower than the pixel electrode 54.

The common electrodes 53 and the pixel electrodes 54 may be either opaque metal electrodes or transparent electrodes. However, if a normally black display mode is desired, it is desirable that the common electrodes 53 and the pixel electrodes 54 are transparent electrodes of ITO (indium tin oxide) or the like.

In this liquid crystal display, alignment layers, not shown, are formed on the inner surfaces of the lower substrate 41 and the upper substrate 40 facing the liquid crystal layer 42, and the alignment layers are finished by an aligning treatment for aligning the alignment layers substantially in parallel to a direction in which the common electrodes 53 are extended. Therefore, when any electric field is not applied to the molecules of the liquid crystal forming the liquid crystal layer 42 formed between the substrates 40 and 41, the molecules of the liquid crystal are arranged homogeneously with their major axes extended in parallel to the direction in which the common electrodes 53 are extended.

The axis of polarization of the polarizer film 43 attached to the outer surface of the upper substrate 40 is parallel to the direction in which the common electrodes 53 are extended, i.e., the direction of the arrow E in FIG. 1, and the axis of polarization of the polarizer film 44 attached to the outer surface of the lower substrate 41 is parallel to a direction perpendicular to the direction in which the common electrodes 53 are extended, i.e., the direction of the arrow F in FIG. 1. A black matrix 67 shown in FIG. 2 covers portions which do not contribute to a displaying function including the thin-film transistors T, the gate lines 50 and the signal lines 51.

In FIGS. 1 and 2 showing the liquid crystal display, a color filter necessary for color picture display is omitted. If the liquid crystal display is a color liquid crystal display, a color filter is disposed on the side of the upper substrate 40, and a red (R) color filter, a green (G) color filter and a blue (B) color filter are disposed on the side of the lower substrate 41 so as to cover the pixel regions 59, respectively.

The thin-film transistor T is controlled to apply a voltage across the common electrodes 53 and the pixel electrode 54 in the desired pixel region 59 or to remove the voltage therefrom to set the pixel region in a display state or a nondisplay state.

If a voltage is applied across the common electrodes 53 and the pixel electrode 54 in the desired pixel region, a lateral electric field is created in a plane including the inner surface of the lower substrate 41, whereby the molecules of the liquid crystal are set in a 90°-twist state, i.e., a luminous state, between the substrates 40 and 41. If no voltage is applied across the common electrodes 53 and the pixel electrode 54 in the pixel region, any lateral electric field is not created, so that the molecules of the liquid crystal are set in a homogeneously set state, i.e., dark state, in which the molecules of the liquid crystal are aligned in the direction in which the alignment layers are aligned by the aligning treatment, i.e., the directions of the arrows 0 and y.

The orientation of the molecules of the liquid crystal can be thus controlled to set the pixel region 59 in the luminous state by allowing the backlight to travel through the pixel region 59 or to set the pixel region 59 in the dark state by intercepting the backlight. This liquid crystal display operates in a normally black display mode, in which pixel regions 59 are in the dark state, i.e., in black, while the molecules of the liquid crystal are not aligned or the same are in the luminous state while the molecules of the liquid crystal are aligned.

The capacitor electrodes 64 and 65 are formed on one side of the insulating layer 58, and the connecting line 57 and the common line 56 are formed on the other side of the insulating layer 58 opposite to the capacitor electrodes 64 and 65, respectively, to form capacitors. Part of parasitic capacitance produced on the liquid crystal display can be canceled out by the capacitors for the stable operation of the thinfilm transistors T. In this embodiment, the capacitor forming electrode 55 is formed below and opposite to the pixel electrode 54 under the insulating layer 58 to form a capacitor.

Figure 14:
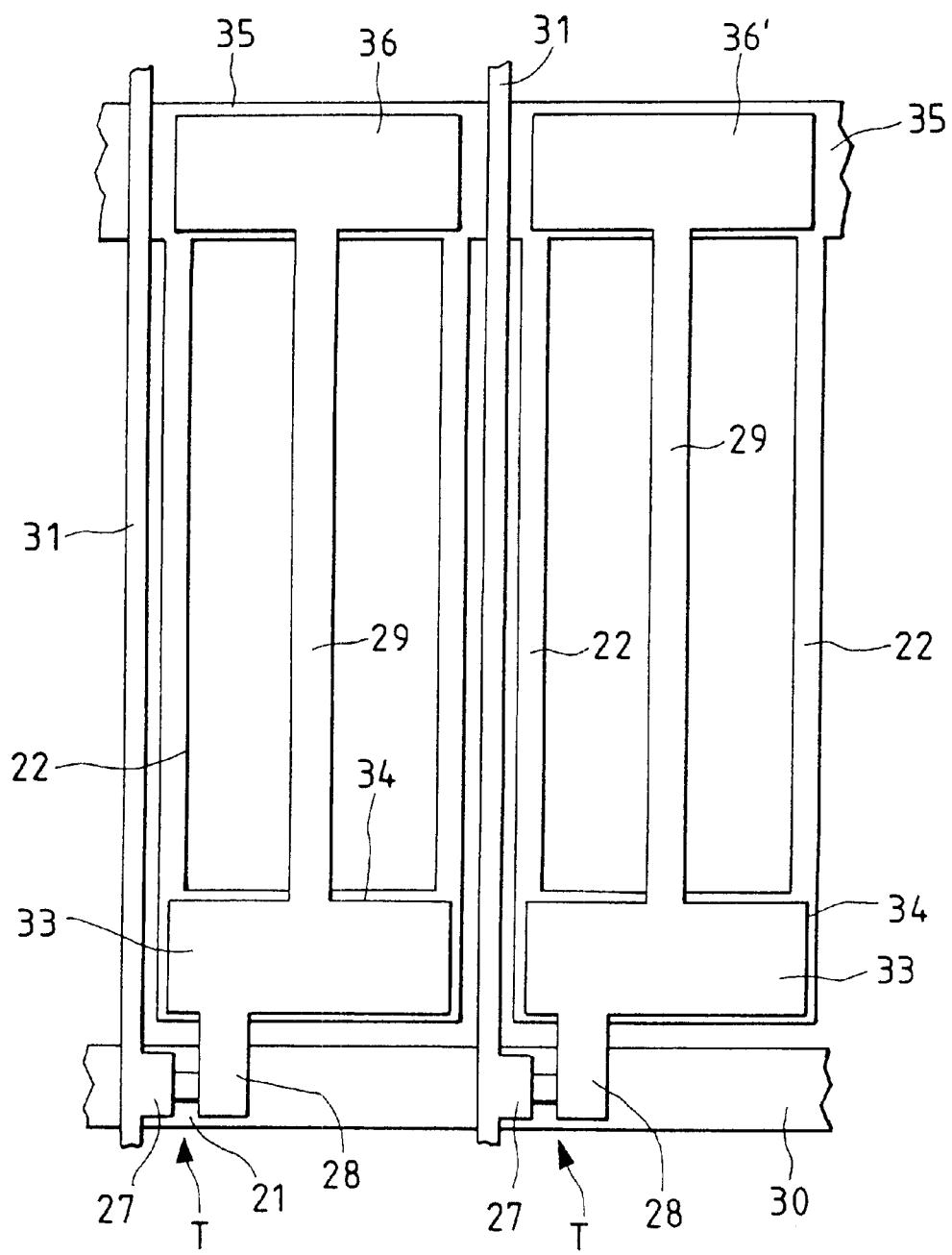
FIG. 14 is a typical plan view of an arrangement of linear electrodes in a structure shown in FIG. 13.

The capacitor electrode 65 of the liquid crystal display of FIG. 1 may be narrower than the corresponding electrode of a liquid crystal display of FIG. 14 when the liquid crystal displays of FIGS. 1 and 14 have the same capacitance, and hence the area of the pixel region 59 increases accordingly and the liquid crystal display of FIG. 1 has an aperture ratio higher than that of the liquid crystal display of FIG. 14.

If the foregoing structure is employed to reduce the parasitic capacitance, the common electrode 53 and the pixel electrode 54 may be narrow because some capacitance can be produced by the overlapping portion and hence the aperture ratio can be increased accordingly. Thus, the pixel regions can be set in the luminous state or the dark state by controlling the orientation of the molecules of the liquid crystal, the visibility of the liquid crystal display is less dependent on viewing angle, and the liquid crystal display has a high aperture ratio.

Figure 9:
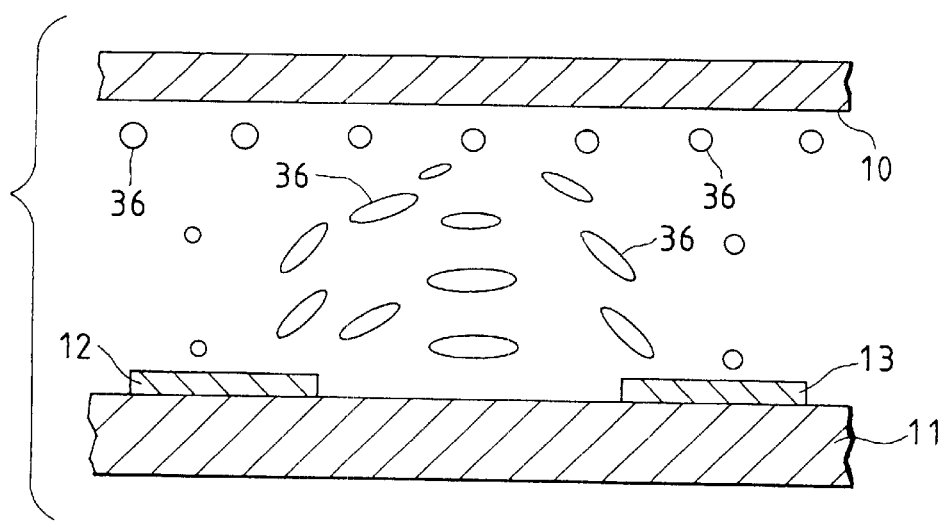
FIG. 9 is a typical sectional view of a liquid crystal display element showing the orientation of molecules of a liquid crystal when a voltage is applied to the linear electrodes of FIG. 8.
Figure 10A:
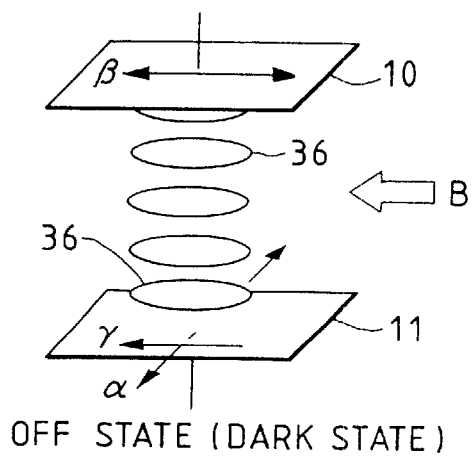
FIG. 10A is atypical perspective view of a liquid crystal display element in a comparative example employing a substrate provided with linear electrodes in a dark state.
Figure 10B:
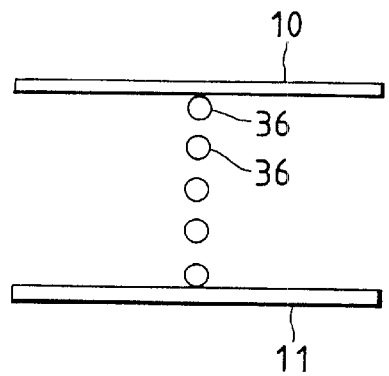
FIG. 10B is a typical side view of the liquid crystal display element of FIG. 10A.
Figure 11A:
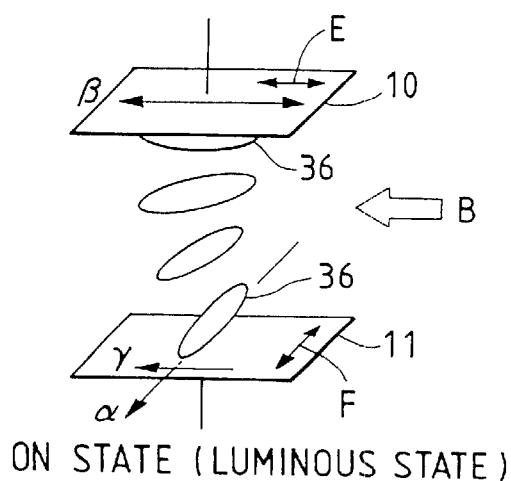
FIG. 11A is atypical perspective view of a liquid crystal display element in a comparative example employing a substrate provided with linear electrodes in a luminous state.
Figure 11B:
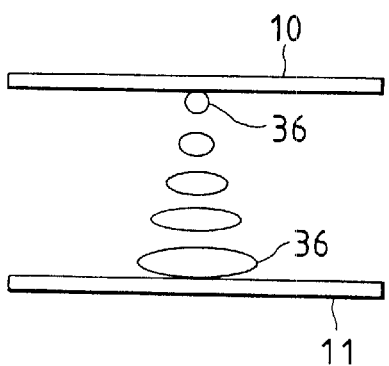
FIG. 11B is a typical side view of the liquid crystal display element of FIG. 11A.
Figure 12:
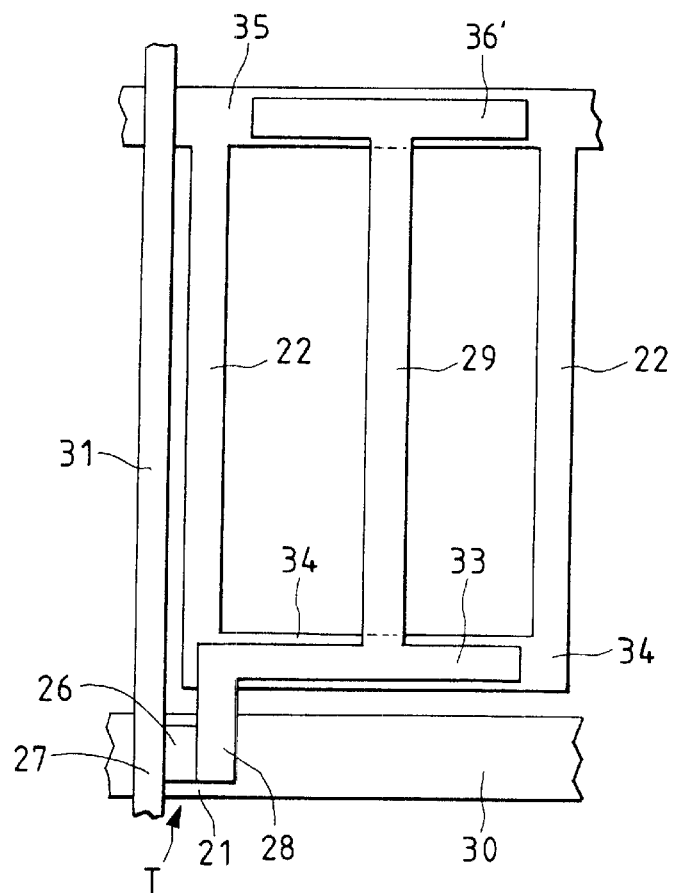
FIG. 12 is a typical plan view of an arrangement of electrodes in a liquid crystal display element.
Figure 13:
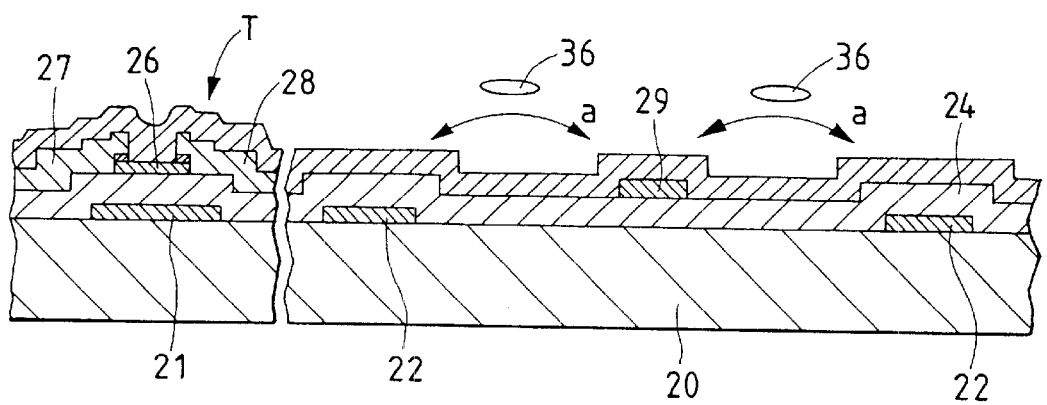
FIG. 13 is a fragmentary typical sectional view of the liquid crystal display element of FIG. 12.

If the common electrodes 53, the pixel electrode 54, the capacitor forming electrode 55 and the capacitor electrodes 64 and 65 are formed by processing transparent films, and the liquid crystal display operates in the normally black display mode, the molecules of the liquid crystal in regions corresponding to the common electrodes 53 rise as shown in FIG. 9, and the regions corresponding to the common electrodes 53 become a luminous state and transmit part of the backlight. Thus, the regions over the common electrode 53 and the pixel electrode 54 contribute to displaying, which increases the aperture ratio of the liquid crystal display.

The condition of the molecules of the liquid crystal in the regions over the common electrode 53 and the pixel electrode 54 does not affect adversely to the dark state because the pixel region is in the dark state when any voltage is not applied to the corresponding pixel electrode 54.

In this embodiment, the pixel electrode 54 is disposed in the middle region of the pixel region 59 because the pixel electrode 54 is less subject to the influence of electric fields created by the gate line 50 and the signal line 51 if the pixel electrode 54 is disposed in an inner region of the pixel region 59.

In this embodiment, the common electrodes 53 are formed on the lower substrate 41, and the pixel electrode 54 is formed in a layer above the common electrodes 53, so that the pixel electrode 54 can be disposed near the liquid crystal layer 42 and hence a high effective voltage is available for driving the liquid crystal.

Figure 3:
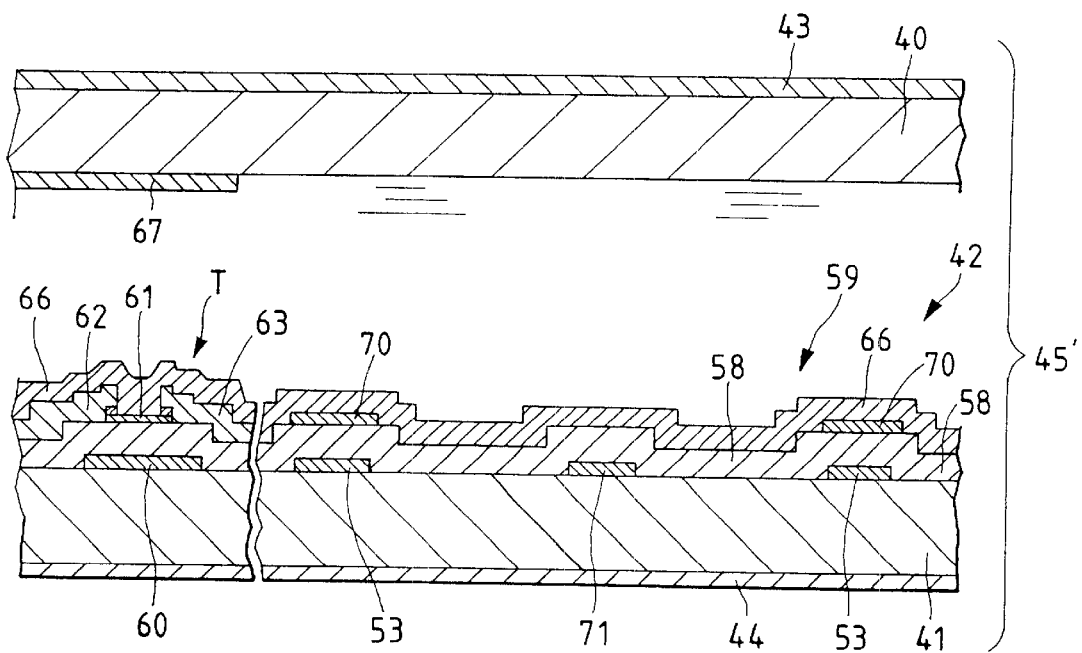
FIG. 3 is a fragmentary typical sectional view of a liquid crystal display in a second embodiment according to the present invention.

Referring to FIG. 3 showing a liquid crystal display in a second embodiment according to the present invention, pixel electrodes 70 are formed in regions on an insulating layer 58 respectively corresponding to common electrodes 53 formed on the inner surface of a lower substrate 41, and each pixel electrode 70 is connected to a drain electrode 63. A common electrode 71 is formed instead of the capacitor forming electrode 55 of the first embodiment, and any electrode is not formed in a region on the insulating layer 58 corresponding to the common electrode 71. The construction of this liquid crystal display in other respects is the same as that of the liquid crystal display in the first embodiment. In FIG. 3, parts like or corresponding to those of the first embodiment are designated by the same reference characters and the description thereof will be omitted.

In this embodiment, the orientation of the molecules of the liquid crystal can be controlled by creating electric fields between the pixel electrodes 70 and the common electrode 71. A capacitor can be formed by the common electrode 71 and the pixel electrode 70 because the common electrode 53 serves also as a capacitor forming electrode.

Figure 4:
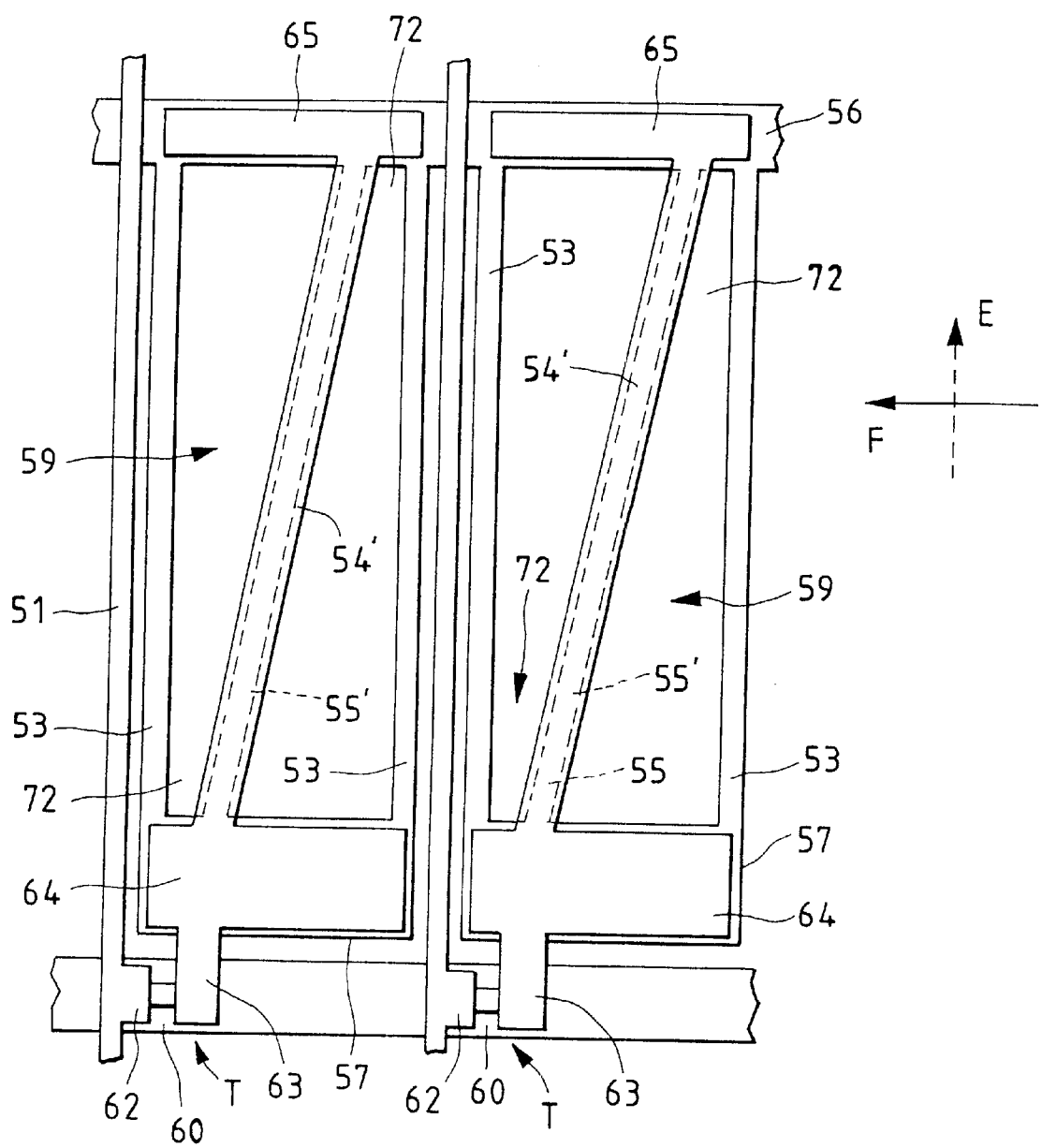
FIG. 4 is a typical plan view of an arrangement of electrodes in a liquid crystal display in a third embodiment according to the present invention.

Referring to FIG. 4 showing a liquid crystal display in a third embodiment according to the present invention, each pixel electrode 54' is extended obliquely to common electrodes 53, and a capacitor forming electrode 55' is formed under and in parallel to the pixel electrode 54'.

Each pixel region 59 is divided into two substantially triangular sections by the pixel electrode 54'. Since the pixel electrode 54' is extended obliquely to the common electrodes 53, narrow regions 72 are formed between the opposite ends of the pixel electrode 54' and the common electrodes 53.

The intensity of an electric field created by the common electrode 53 and the pixel electrode 54' in the narrow region 72 is higher than that of the electric field in other regions and hence the molecules of a liquid crystal in the narrow region can be intensely driven by a high voltage to make the liquid crystal response at a high response speed. Therefore, the liquid crystal in the region including the common electrodes 53 and the pixel electrode 54' can be made to respond at a high response speed without increasing the number of linear electrodes and without reducing aperture ratio. The response speed of halftone regions, i.e., regions which is luminous when a driving voltage is low, can be enhanced by the employment of the foregoing structure.

Since a human is more sensitive to response speed when the halftone region is more luminous. Therefore, the response speed can be enhanced in a display region in which the halftone region which is easy for a human to recognize is luminous by the employment of the foregoing structure. Since the tendency of variation of the ratio of people who are sensitive to a flicker is the same as that in the case of halftone displaying, a flicker in halftone displaying can be made less conspicuous by the employment of the foregoing structure.

FIRST EXAMPLE

A thin-film transistor liquid crystal display of a circuit configuration similar to that shown in FIG. 1 was fabricated. A thin-film transistor circuit having common electrodes as shown in FIG. 1 was formed on a first transparent substrate and an alignment layer was formed over the thin-film transistor circuit. An alignment layer was formed on a second transparent substrate. The alignment layers were aligned by a rubbing process for aligning the molecules of a liquid crystal. The two transparent substrates were disposed opposite to each other at a predetermined interval with cell gap forming beads held therebetween so as to form a cell gap, the cell gap was filled up with the liquid crystal, the two transparent substrates were joined together with a sealing member so as to seal liquid crystal in the cell gap, and polarizer films were attached to the outer surfaces of the transparent substrates to complete a liquid crystal display element. In this structure, the alignment layers were rubbed for aligning with a rubbing roller in a direction perpendicular to a direction in which common electrodes are extended.

When fabricating the liquid crystal display, 10 $\mu$m wide Cr gate lines were formed at intervals of 129 $\mu$m on the first transparent substrate, and 16 $\mu$m wide Cr common lines were formed contiguously with the gate lines, respectively. A 6 $\mu$m wide common electrodes were projected from the common line perpendicularly to the common line in the opposite corners of each pixel region. The common line formed in the middle portion of each pixel region was provided with a 3 $\mu$m wide Cr capacitor forming electrode.

A $SiN_x$ insulating layer was formed so as to cover those lines and electrodes, and a 4 $\mu$m wide Cr pixel electrode was formed in parallel to the common electrodes in a middle portion between the common electrodes formed at the opposite ends of each pixel region. A thin-film transistor comprising a semiconductor film of a-Si, a gate electrode formed on one side of the semiconductor film, and a source electrode formed on the other side of the semiconductor film was formed near a region where a gate line and a signal line intersect each other. These elements were covered with a coating layer, an alignment layer of a polyimide resin was formed, and then the alignment layer was processed by an aligning process using a rubbing roller to complete a transistor array substrate.

A thin-film transistor liquid crystal display in a first comparative example was fabricated. This liquid crystal display was provided with a circuit of a configuration shown in FIG. 14 and was not provided with any capacitor forming electrodes.

The respective measured aperture ratios of the liquid crystal display in the first example and the liquid crystal display in the first comparative example were 40.1% and 38%, respectively, which proved that the structure in accordance with the present invention shown in FIG. 1 increases aperture ratio.

SECOND EXAMPLE

A liquid crystal display in a second example the same in basic construction as the liquid crystal display in the first example was fabricated. In this liquid crystal display, 3 $\mu$m wide Cr pixel electrodes were formed on an insulating layer at an inclination of 8.2° to common electrodes formed on a substrate, and the pixel electrodes were connected to drain electrodes.

A liquid crystal display in a second comparative example was fabricated. This liquid crystal display was provided with a linear electrode structure formed by extending linear electrodes in parallel to linear electrodes as shown in FIG. 14 instead of the linear electrode structure shown in FIG. 4. The aperture ratio of the liquid crystal display in the second example was higher than that of the liquid crystal display in the second comparative example.

Figure 5:
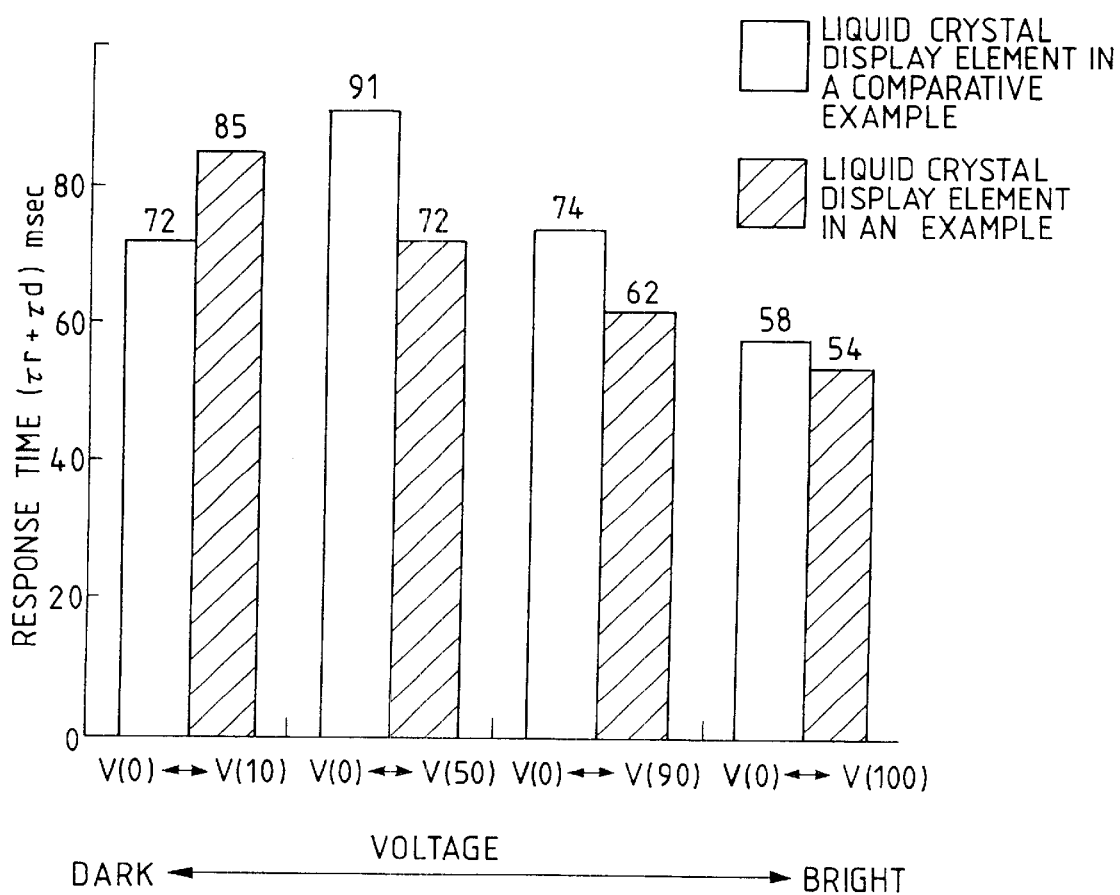
FIG. 5 is a graph comparatively showing the relation between applied voltage and response speed in a liquid crystal display in accordance with the present invention and a liquid crystal display in a comparative example.

The respective response speeds of the liquid crystal display in the second example and the liquid crystal display in the second comparative example were measured. Measured results are shown in FIG. 5, in which V(100), V(90), V(50), V(10) and V(0) are driving voltages necessary to make the transmittance of the pixel region a maximum (100% transmittance), 90% of the maximum, 50% of the maximum, 10% of the maximum, and 0% of the maximum, respectively, and response speeds were measured for voltage change modes V(0)⇌V(10), V(0)⇌V(50), V(0)⇌V(90) and V(0)⇌V(100) indicating that the driving voltage was changed between V(0) and V(10), between V(0) and V(50), between V(0) and V(90) and between V(0) and V(100), respectively. In FIG. 5, response speed is expressed by response time equal to the sum of rise time $\tau_r$ and fall time $\tau_d$, and response time is measured upward on the vertical axis.

As is obvious from FIG. 5, the response speed of the liquid crystal display of the present invention is lower than that of the liquid crystal display in the second comparative example in a low-luminance range, i.e., in the voltage change mode V(0)⇌V(10), and is higher than that of the liquid crystal display in the second comparative example in a medium-luminance range, i.e., in the voltage change mode V(0)⇌V(50), and in high-luminance ranges, i.e., in the voltage change modes V(0)⇌V(90) and V(0)⇌V(100). In the medium-luminance range V(0)⇌V(50)), in particular, whereas the response time of the liquid crystal display in the second comparative example is 91 msec, the response time of the liquid crystal display in the second embodiment is only 72 msec. There is a tendency that the higher the luminance, the shorter the response time.

Figure 6:
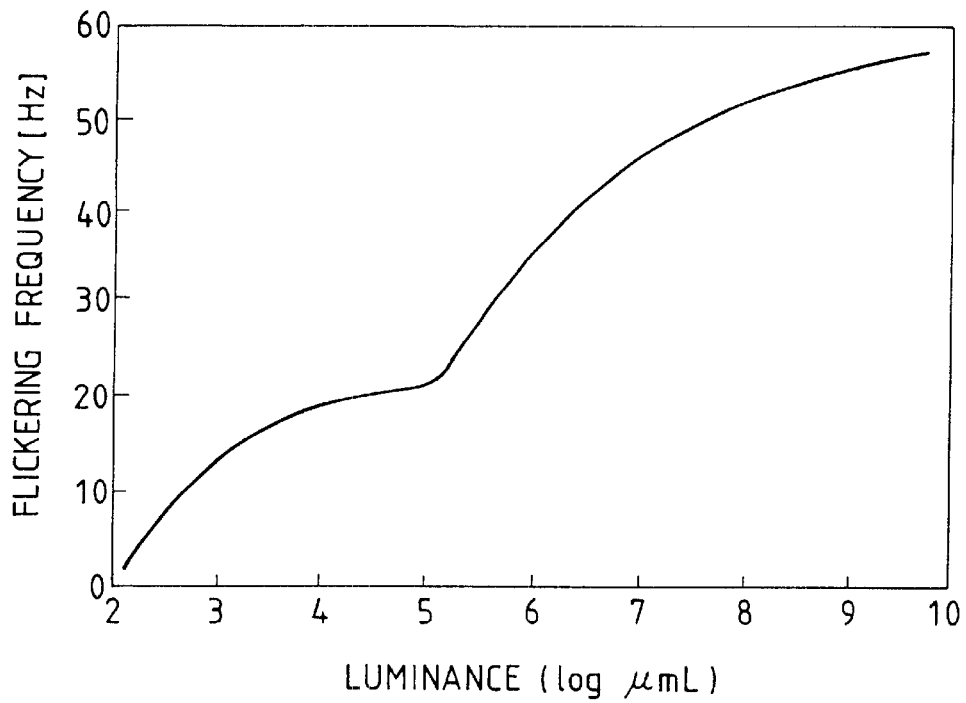
FIG. 6 is a graph showing the relation between light intensity and flicker frequency.
Figure 7:
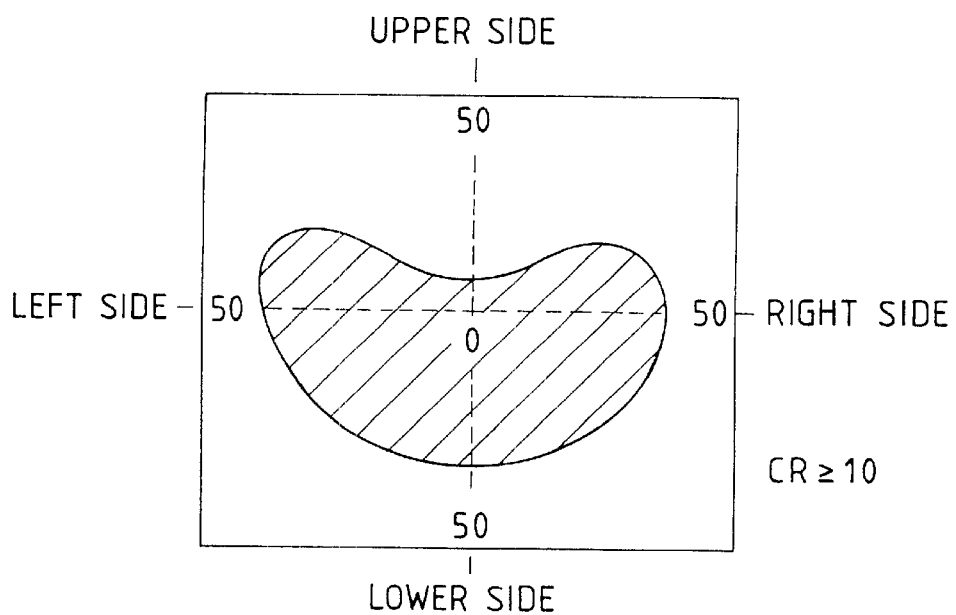
FIG. 7 is a diagram showing the dependence of the visibility of a general TN mode liquid crystal display on viewing angle.
Figure 8:
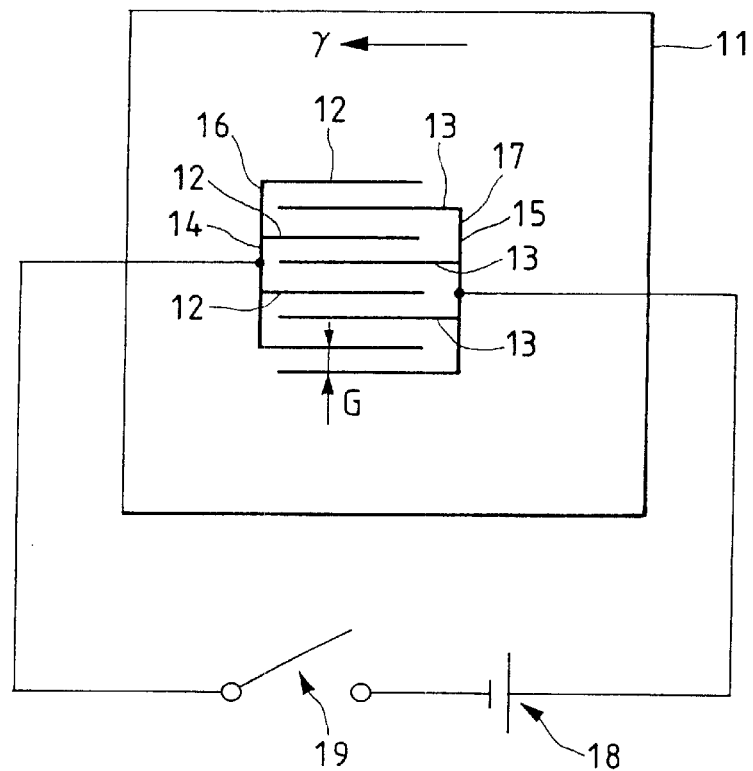
FIG. 8 is a diagrammatic plan view of a substrate of a liquid crystal display in a comparative example provided with linear electrodes

FIG. 6 shows the variation of critical flicker frequency (CFF), i.e., a maximum frequency of a flicker of light which can be felt by a human (flicker of light of a frequency higher than the CFF cannot be recognized by a human), on the luminance of the screen of a liquid crystal display. As is known from FIG. 6, the higher the luminance, the higher the CFF; that is, the human eye is able to follow the quicker variation of luminance with time when the luminance is higher. Accordingly, it is considered that the human eye is more sensitive to quick variation of luminance with time when the luminance is high than when the luminance is low.

It is known from the examination of FIG. 6 on the basis of the foregoing consideration that the response speed of the normally black liquid crystal display in the second example having the foregoing configuration rises with the rise of the luminance, and, from the viewpoint of human engineering, the liquid crystal display in the second example is superior to the liquid crystal display in the second comparative example. Although the average response speed of the liquid crystal display in the second example not very high, the liquid crystal display in the second example is greatly improved in respect of effects on the human eye.

Figure 15:
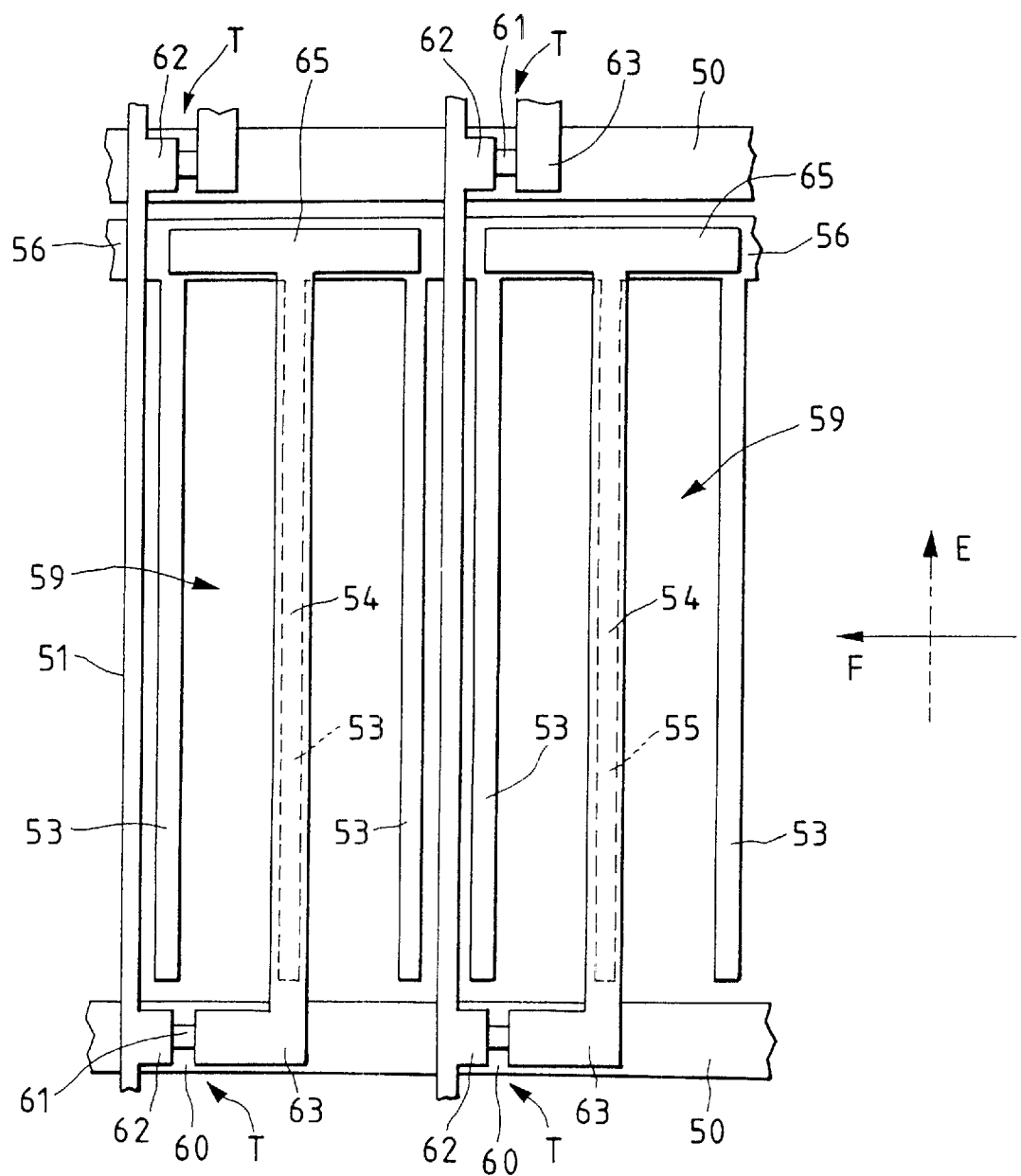
FIG. 15 is fragmentary typical plan view of a liquid crystal display in a fourth embodiment according to the present invention.

FIG. 15 shows a liquid crystal display in a fourth embodiment according to the present invention. As shown in FIG. 15, this liquid crystal display does not have any line corresponding to the connecting line 57 and any electrodes corresponding to the capacitor electrodes 64 of the structure shown in FIG. 1, and end portions of common electrodes 53 are not interconnected. The liquid crystal display having the structure shown in FIG. 15 is the same in effect as the liquid crystal display in the first embodiment.

Figure 16:
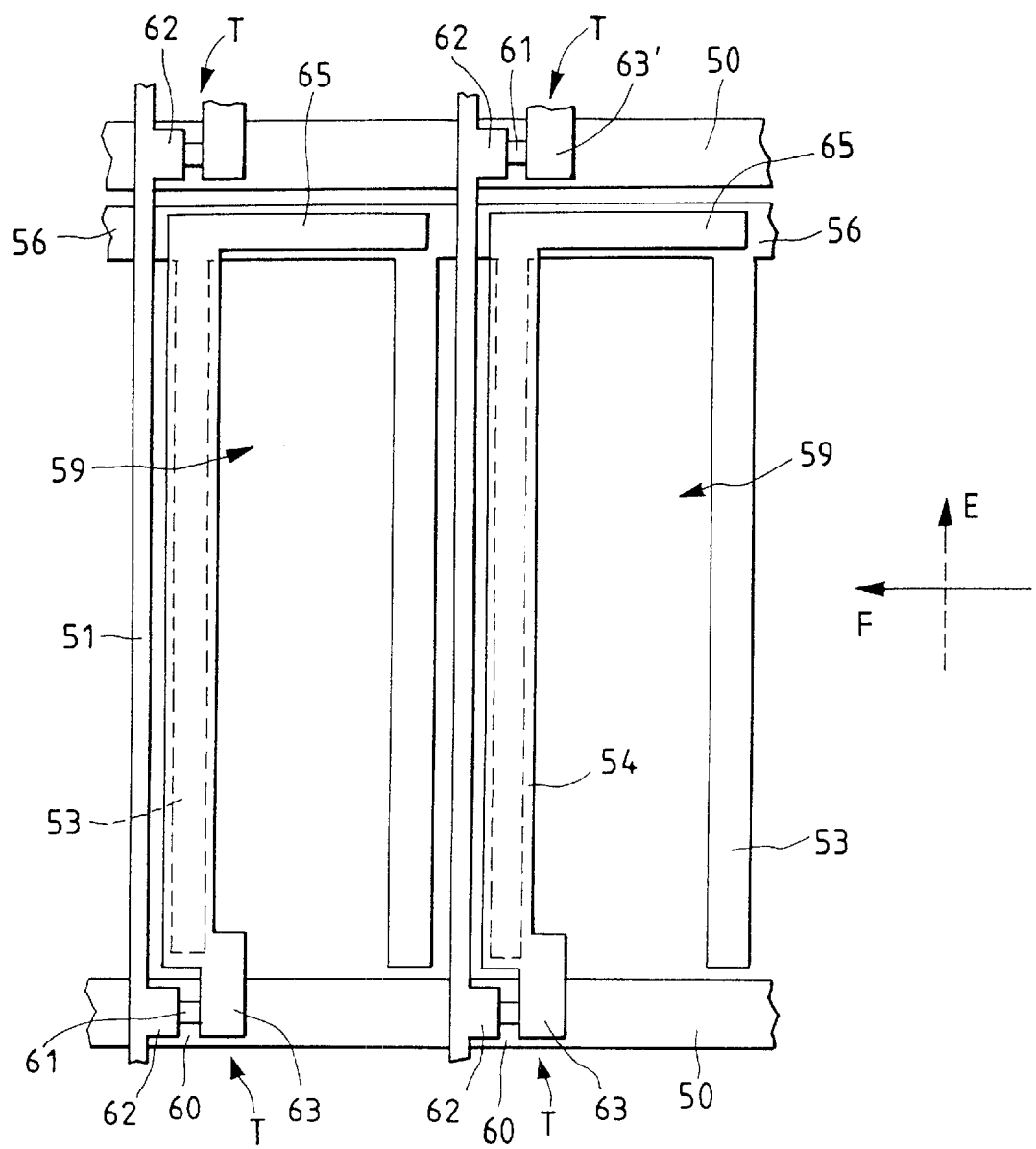
FIG. 16 is fragmentary typical plan view of a liquid crystal display in a fifth embodiment according to the present invention.
Figure 17:
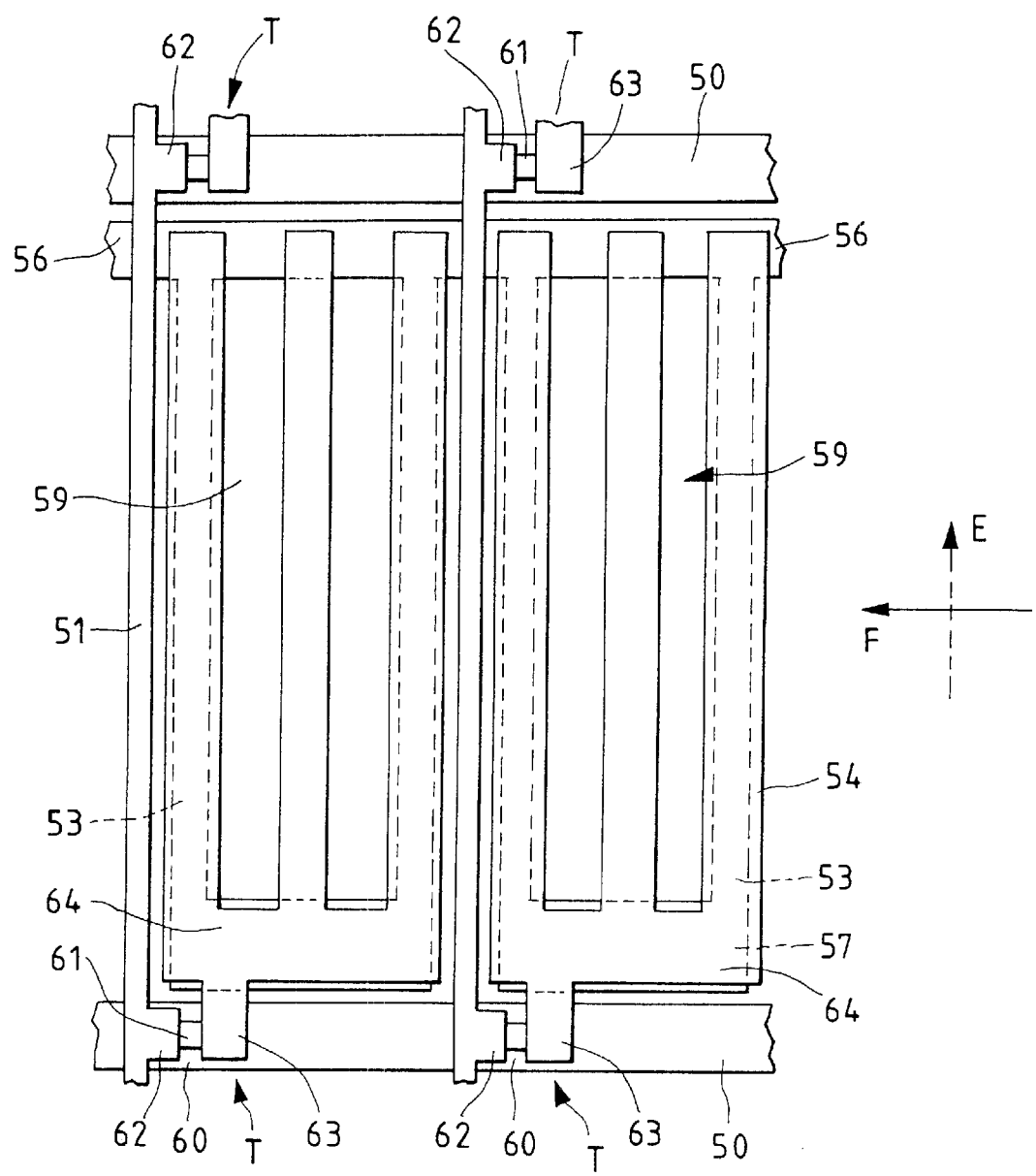
FIG. 17 is fragmentary typical plan view of a liquid crystal display in a sixth embodiment according to the present invention.

FIGS. 16 and 17 show liquid crystal displays in fifth and sixth embodiments, respectively. In the liquid crystal display shown in FIG. 16, two common electrodes 53 are formed in the opposite side sections of each pixel region, and one pixel electrode 54 overlies one of the two common electrodes 53. In the liquid crystal display shown in FIG. 17, two common electrodes 53 are formed in the opposite side sections of each pixel region, and three pixel electrodes 54 are formed in the opposite side sections and a middle section of each pixel region. The liquid crystal displays in the fifth and the sixth embodiment are the same in effect as the liquid crystal display in the first embodiment.

THIRD EXAMPLE

Figure 18:
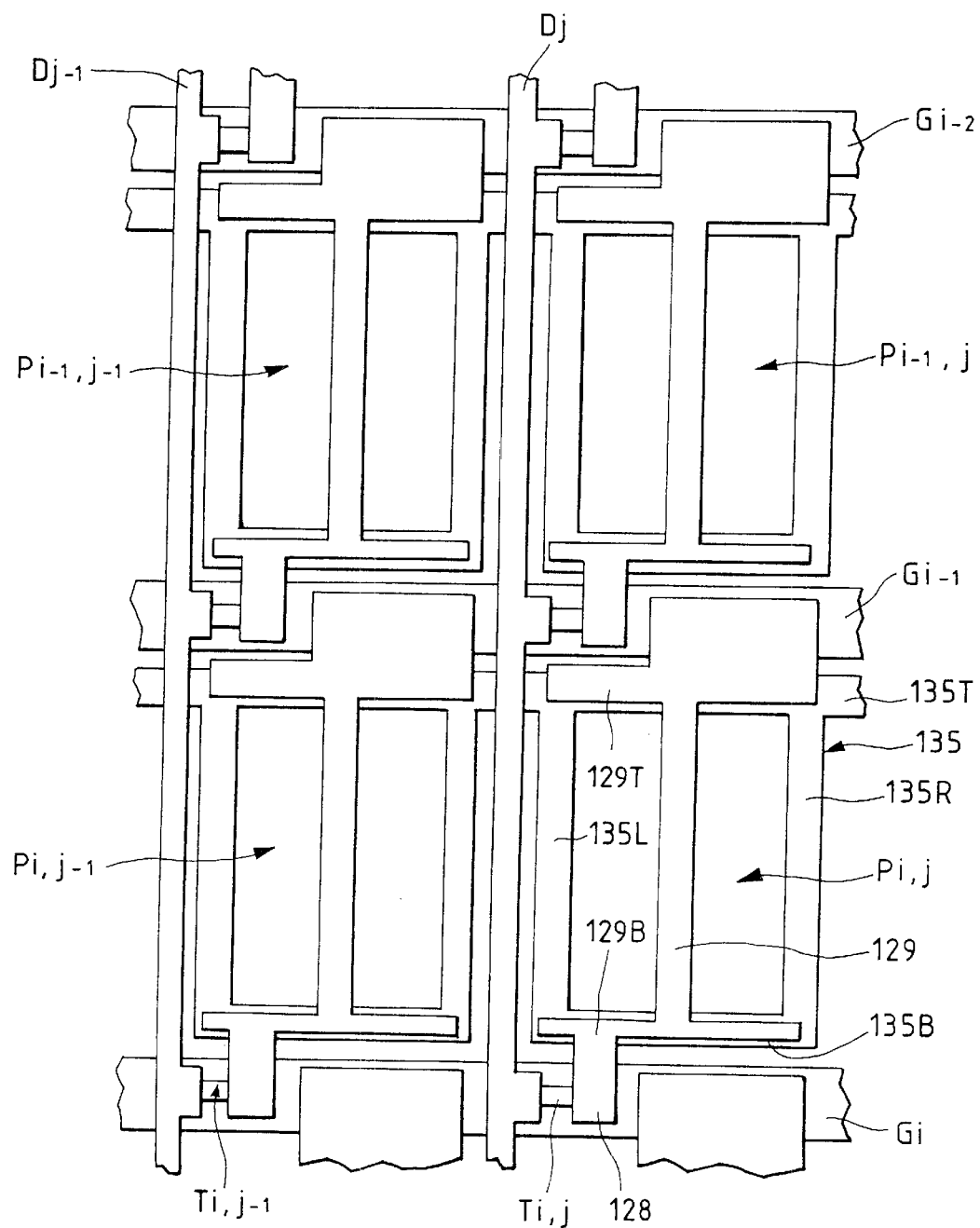
FIG. 18 is a fragmentary typical plan view of an active matrix liquid crystal display in a third example in accordance with the present invention.

FIG. 18 is a plan view of an active matrix liquid crystal display in a third example in accordance with the present invention. As shown in FIG. 18, the active matrix liquid crystal display in the third example has a storage capacitor formed of horizontal sections 129T and 129B of a pixel electrode 129, a common line 135T, and a horizontal section 135B of a common electrode 135, and a storage capacitor formed of the horizontal section 129T of the pixel electrode 129, and a gate line for the adjacent pixel in addition to a storage capacitor corresponding to that of the active matrix liquid crystal display in the third comparative example. In the active matrix liquid crystal display in the third example, the width of a portion (extension) of a horizontal section 129T of a pixel electrode 129 for a pixel $P_{i,j}$ is increased so that the portion of the horizontal section 129T of the pixel electrode 129 overlies a gate line $G_{i-1}$ of the adjacent pixel $P_{i-1,j}$. Thus, the horizontal section 129T overlap the gate line $G_{i-1}$ as well as the common line 135T to form a storage capacitor by the horizontal section 129T and the gate line $G_{i-1}$.

A signal voltage applied to the pixel electrodes 129 of the pixels $P_{i,j}$ (j=1 to M) is held by the storage capacitors each consisting of the horizontal section 129T of the pixel electrode 129 and the common line 135T, the storage capacitors each consisting of the horizontal section 129B of the pixel electrode 129 and the horizontal section 135B of the common electrode 135, and the storage capacitor each consisting of the horizontal section 129T of the pixel electrode 129 and the gate line $G_i$.

Since the storage capacitor is formed by using the gate line, a necessary storage capacitor can be formed even if the area of the overlapping portions of the horizontal section 129T of the pixel electrode 129 and the common line 135T, and the area of the overlapping portions of the horizontal section 129B of the pixel electrode 129 and the horizontal section 135B of the common electrode 135 are small. Accordingly, the liquid crystal display of the present invention has a aperture ratio far higher than that of the conventional liquid crystal display. More specifically, whereas the aperture ratio of a liquid crystal display designed on the basis of the conventional design standards was only 27%, the aperture ratio of a liquid crystal display employing the structure shown in FIG. 18 designed on the basis of the same design standards was as high as 35%. Accordingly, the luminance of the display screen of the liquid crystal display employing the structure shown in FIG. 18 as illuminated by backlight is 35/27≈1.3 times that of the liquid crystal display employing the conventional structure as illuminated by the same backlight and, therefore, the former liquid crystal display needs about 30% less power than the latter liquid crystal display in providing the same luminance.

Although the liquid crystal display in the third example is provided with both the storage capacitor consisting of the horizontal section 129T of the pixel electrode 129 and the common line 135T and the storage capacitor consisting of the horizontal section 129B of the pixel electrode 129 and the horizontal section 135B of the common electrode 135, if one of those storage capacitors has a necessary capacitance, the other may be omitted. Although the ratio between the respective capacitances between the pixel electrode and the common electrode and between the pixel electrode and the gate line is not limited to a particular value, it is preferable that the capacitance between the pixel electrode and the gate line is large to make the aperture ratio high.

A driving circuit included in the active matrix liquid crystal display in the third example will be described hereinafter. This active matrix liquid crystal display, similarly to other liquid crystal displays, needs to be driven by an inversion drive system.

Figure 19:
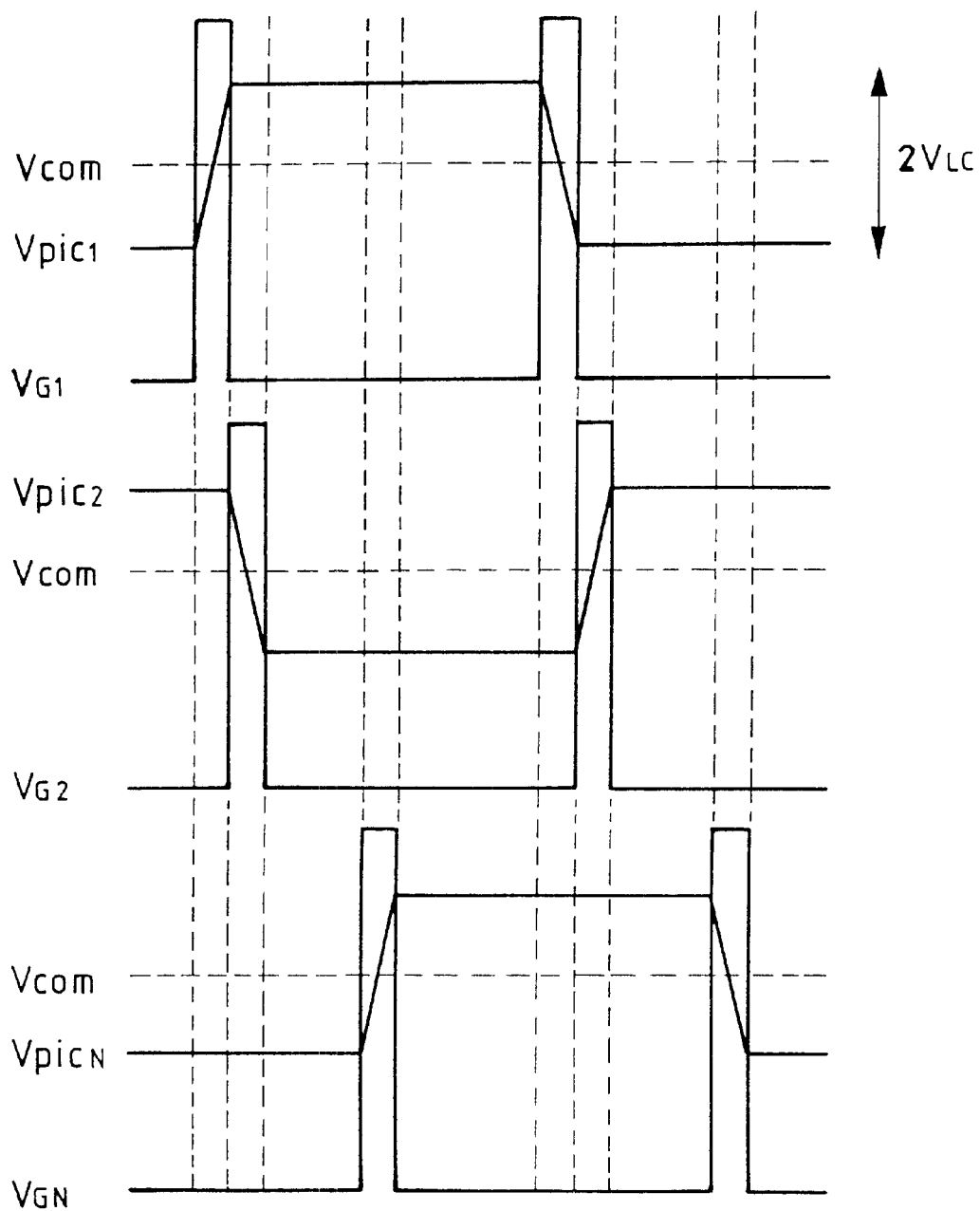
FIG. 19 is a waveform chart showing signals generated when driving the liquid crystal display in the third example.

A dot inversion drive system is an example of inversion drive systems. FIG. 19 is a waveform chart showing signals generated when driving the liquid crystal display in the third example by a dot inversion drive system. Referring to FIG. 19, $V_{com}$ is a common voltage to be applied to each common electrode, $V_{G1}$ to $V_{GN}$ are gate voltages applied to the gate lines $G_1$ to $G_N$, $V_{pic1}$ to $V_{picN}$ are signal voltages to be applied to the pixel electrodes of pixels on the N-th row when the corresponding thin-film transistors (TFTS) are turned on by the gate voltages $V_{G1}$ to $V_{GN}$.

When driving the active matrix liquid crystal display by the dot inversion drive system, the common voltage $V_{com}$ is kept constant, and the polarities of the signal voltages $V_{pic1}$ to $V_{picN}$ are reversed with respect to the common voltage $V_{com}$ to drive the pixels. The polarities of the signal voltages are inverted every one field period so as to apply signal voltages of opposite polarities to the pixels connected to the two adjacent gate lines, respectively as shown in FIG. 19. Being capable of suppressing crosstalk, of not causing a conspicuous flicker and of displaying pictures in a high picture quality, this dot inversion drive system is often used also for driving TN mode liquid crystal displays.

Figure 20:
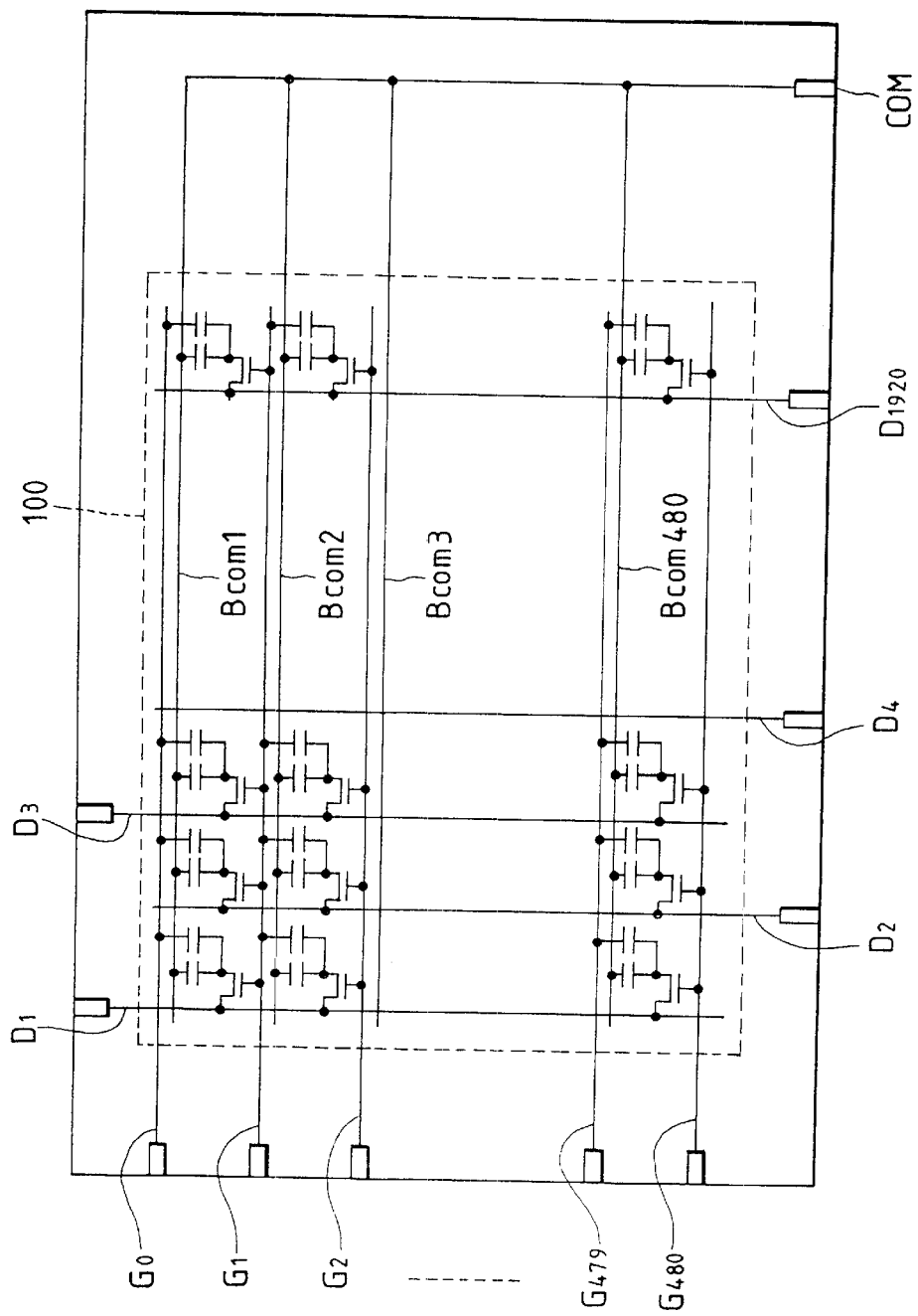
FIG. 20 is a diagrammatic view showing the layout of the component parts of a liquid crystal driving circuit included in the third example.

FIG. 20 shows the layout of a driving circuit for driving the liquid crystal display in the third example of the present invention by the dot inversion driving system. This driving circuit is designed for driving a liquid crystal display of the VGA system (video graphics array system) and has a grid of 480 gate lines $G_1$ to $G_{480}$ and 1920 signal lines $D_1$ to $D_{1920}$. A gate line $G_0$ is not a line used for applying a gate voltage; the same is a dummy gate line for forming storage capacitors between the same and the pixel electrodes of the pixels on the first row. Common electrode bus lines $B_{com1}$ to $B_{com480}$ for applying the common voltage to the common electrodes of the pixels are extended in parallel to the gate lines $G_0$ to $G_{480}$. The common electrode bus lines $B_{com1}$ to $B_{com480}$ are connected to a common voltage applying terminal COM in a marginal area outside a display area 100.

In some cases it is more preferable, when leveling out all the common potentials of the common electrodes, to apply the common voltage through a plurality of terminals to the common electrode bus lines $B_{com1}$ to $B_{com480}$ than to apply the common voltage through the single common voltage applying terminal COM to the common electrode bus lines $B_{com1}$ to $B_{com480}$. The number of common voltage applying terminals COM is determined taking into consideration such circumstances.

FOURTH EXAMPLE

Figure 21:
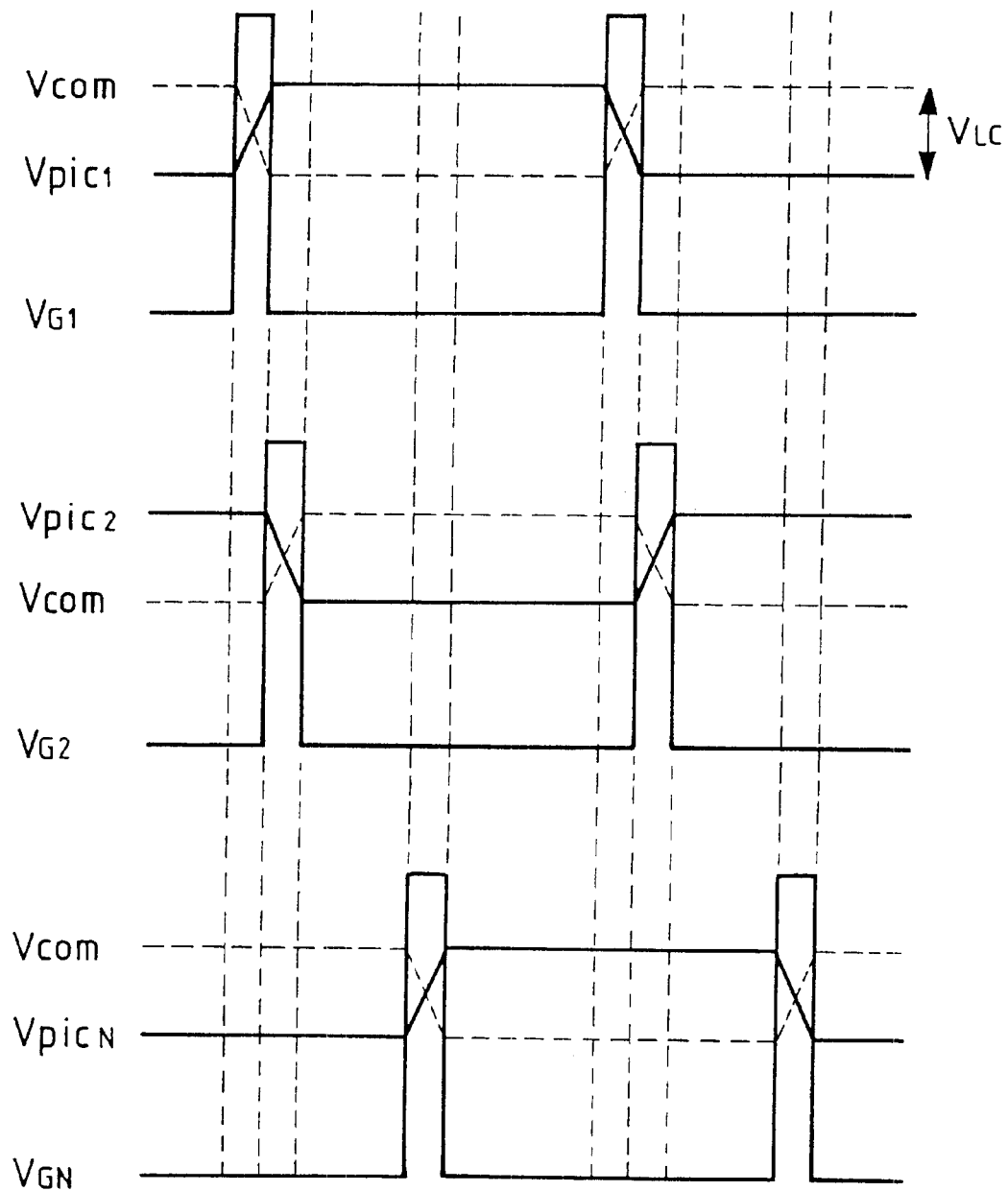
FIG. 21 is a waveform chart showing signals generated when driving the liquid crystal of an active matrix liquid crystal display in a fourth example in accordance with the present invention.

In the liquid crystal display in the third example, the common voltage $V_{com}$ is kept constant while the pixels of the liquid crystal display are driven. In the fourth example, the common voltage applied to the common electrodes is changed to change the polarity of the voltage applied to the liquid crystal to apply the voltage of opposite polarities to the liquid crystal at alternate scanning lines, respectively, in synchronism with the application of the signal voltage to the pixels by applying the gate voltage to the gate lines. FIG. 21 shows signals generated when driving the liquid crystal of the active matrix liquid crystal display in the fourth example in accordance with the present invention.

In the liquid crystal display in the third example, the polarities of the signal voltages $V_{pic1}$ to $V_{picN}$ are reversed with respect to the common voltage $V_{com}$ to drive the pixels. Therefore, a source driver needs to provide a voltage of an amplitude $2V_{LC}$ on each signal line to apply a voltage $V_{LC}$ to the liquid crystal in each pixel. Therefore, the power consumption of the source driver is relatively high and the source driver must have a high withstand voltage.

In the fourth example, the level of the common voltage $V_{com}$ is changed in synchronism with the inversion of the polarities of the signal voltages $V_{pic1}$ to $V_{picN}$ applied to the pixels; that is, the polarity of the common voltage $V_{com}$ changes between opposite polarities so that the polarity of the common voltage $V_{com}$ is always opposite to that of the signal voltage as shown in FIG. 21. Therefore, a signal voltage of only an amplitude $V_{LC}$ is necessary for applying a voltage $V_{LC}$ to the liquid crystal of each pixel and hence the power consumption of the source driver is relatively low and the withstand voltage of the source driver need not be very high. The foregoing effect is very important for liquid crystal displays like the liquid crystal display in the third example which drives the liquid crystal by the lateral electric field because the liquid crystal display needs a signal voltage higher than that is used by TN mode liquid crystal displays.

In the fourth example, the maximum voltage applied to the source electrodes and the drain electrodes of the TFTs in the display area, i.e., the maximum amplitude of the signal voltage for writing, is $V_{LC}$ as shown in FIG. 21, which is half the maximum voltage used by the dot inversion driving system. Consequently, leakage current in a state where the TFT is turned off and the signal voltage is stored by the pixel electrode can be greatly reduced and hence the storage capacitance secured by the pixel electrode for the enhancement of storage capacity may be reduced. Therefore, the area of the overlapping portions of the pixel electrode and the common electrode may be reduced to increase the aperture ratio.

Figure 22:
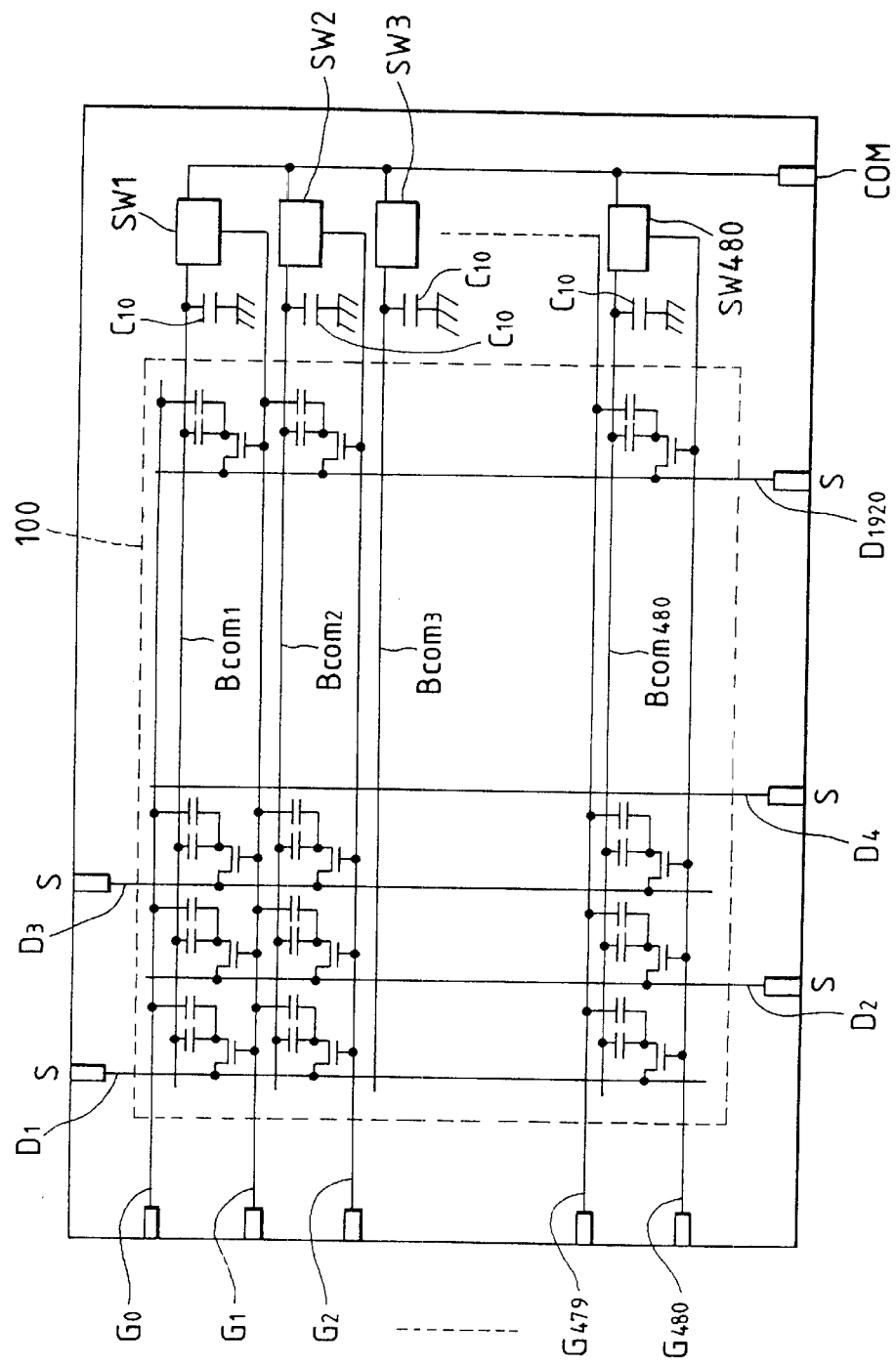
FIG. 22 is a diagrammatic view showing the layout of the component parts of a liquid crystal driving circuit included in the fourth example.

FIG. 22 shows the layout of a driving circuit for driving the liquid crystal display in the fourth example of the present invention similar to the driving circuit shown in FIG. 20. Common electrode bus lines $B_{com1}$ to $B_{com480}$ for applying the common voltage to the common electrodes of the pixels are extended in parallel to gate lines $G_1$ to $G_{480}$. Capacitors C10 for storing the common voltage $V_{com}$ are connected to the common electrode bus lines $B_{com1}$ to $B_{com480}$, respectively. The common electrode bus lines $B_{com1}$ to $B_{com480}$ are connected through switches SW1 to SW480 to a common voltage applying terminal COM in a marginal area outside a display area 100. The switches SW1 to SW480 are turned on by the gate voltages applied to the gate lines $G_1$ to $G_{480}$.

If, for example, the gate voltage is applied to the gate line $G_1$ to turn on the TFTs connected to the gate line $G_1$, the switch SW1 is closed. When signal voltages are applied through the signal lines $D_1$ to $D_{1920}$ to the pixels on the first row, the polarity of the common voltage $V_{com}$ applied to the terminal COM is inverted. Consequently, the capacitor C10 is charged by the common voltage $V_{com}$ applied thereto through the switch SW1, and the polarity of the common voltage $V_{com}$ provided on the common electrode bus line $B_{com1}$ is inverted upon the application of the signal voltages to the pixels on the first row. Since the switches other than the switch SW1 are in an open state, only the capacitive load of one row is connected through the switch SW1 to the terminal COM. Therefore, only a small load is loaded on a power supply for providing the common voltage and hence the power consumption of the power supply is low. Since the driving circuit shown in FIG. 22 for driving a liquid crystal display of the VGA system has 480 gate lines $G_1$ to $G_{480}$, the capacitive load on the power supply for providing the common voltage is on the order of 1/480 of the capacitive load on the power supply when the polarity of all the common voltages applied to the common electrodes are inverted simultaneously and, theoretically, the power consumption of the power supply is on the order of 1/480 of that of the power supply necessary when the polarity of all the common voltages applied to the common electrodes are inverted simultaneously.

The driving circuit may be provided with the smallest necessary number of the capacitors C10 for storing the common voltage $V_{com}$ and the capacitors C10 are unnecessary if the capacitances of storage capacitors originally connected to the common electrode bus lines are large.

According to the present invention, the alignment of molecules of the liquid crystal can be controlled by creating and removing the electric field to select a luminous state for a displaying mode or a dark state for a nondisplaying mode because an electric field of a direction parallel to the surface of the substrate can be created by the common electrode and the pixel electrode formed on the substrate. The common electrode is able to form a capacitor in combination with the pixel electrode to stabilize the operation of the switching element in creating the lateral electric field or removing the lateral electric field because the common electrode is provided with a capacitor forming electrode.

According to the present invention, the major axes of molecules of the liquid crystal are not set in a position perpendicular to the surfaces of the substrates and hence the liquid crystal has a high viewing angle characteristic because molecules of the liquid crystal are aligned homogeneously in parallel to the substrates or are twisted between the pair of substrates, and the liquid crystal display is set in the luminous state or the dark state by turning molecules of the liquid crystal with the major axes of molecules of the liquid crystal always in parallel to the substrates. Furthermore, the operation of the switching elements can be stabilized.

Since the width of the portion of the pixel electrode is greater than that of the corresponding portion of the capacitor forming electrode in a region in which the pixel electrode and the capacitor forming electrode overlap each other so as to cover the capacitor forming electrode with the pixel electrode, the aperture ratio is not reduced by the capacitor forming electrode, and the liquid crystal is not affected by the capacitor forming electrode. Thus, the liquid crystal display has a high aperture ratio and a high viewing angle characteristic, and is capable of stabilizing the operation of the switching elements.

According to the present invention, the pixel electrodes can be disposed near the liquid crystal and a high effective voltage is available for liquid crystal driving, and hence low-voltage driving is possible because the common electrode is formed on one of the pair of substrates, and the pixel electrode is formed above the common electrode.

According to the present invention, a necessary storage capacity can be secured even if the area of the opposite portions of the pixel electrode and the common electrode is small because part of the capacitor for storing the signal voltage to be applied to each pixel is formed by a portion in a region in which the extension of the pixel electrode and the gate line corresponding to the adjacent pixel intersect each other. Consequently, the active matrix liquid crystal display has a high aperture ratio and is able to save power consumption for backlighting.

According to the present invention, the power consumption of the source driver which generates the signal voltage can be suppressed and the withstand voltage of the source driver may be relatively low because an expected electric field can be created between the pixel electrode of the pixel and the common electrode even if the amplitude of the signal voltage is not very large.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An active matrix liquid crystal display of a lateral electric field drive system comprising:

first and second transparent substrates disposed with a space therebetween;

a liquid crystal filling up the space between the first and second transparent substrates;

gate lines formed on an inner surface of the first transparent substrate;

signal lines formed on the inner surface of the first transparent substrate such that the signal lines extend across the gate lines, the signal lines and gate lines defining a matrix of pixel regions and pixels;

pixel electrodes formed in the pixel regions on the first transparent substrate;

common lines extending in parallel with the gate lines and having common electrodes extending in a direction parallel with the pixel electrodes, the common lines and the common electrodes formed on the first transparent substrate to create an electric field substantially parallel to the surface of the transparent substrate in cooperation with the pixel electrode to drive molecules of the liquid crystal to display pictures; and capacitor forming electrodes formed under and spaced from the pixel electrode such that a capacitor is formed with the pixel electrode, the capacitor forming electrodes integrally formed with the common lines and completely overlapped by the pixel electrodes;

wherein the gate lines, common lines, common electrodes, and capacitor forming electrodes are disposed on a first layer, and the signal lines and pixel electrodes are disposed on a second layer.

2. A liquid crystal display according to claim 1, wherein each of the pixel electrodes is formed in an inner portion of each of the plurality of pixel regions, the common electrode defining each of the pixel regions is formed opposite to the pixel electrode, and the capacitor forming electrode is formed in an inner portion of the common electrode.

3. A liquid crystal display according to claim 1, wherein corresponding portions of each pixel electrode and each capacitor forming electrode are formed in the shape of a strip, and the width of the portion of the pixel electrode is greater than that of the corresponding portion of the capacitor forming electrode.

4. A liquid crystal display according to claim 1, wherein the common electrodes are formed on the substrate provided with the pixel electrodes, and the pixel electrodes overlie the common electrodes, respectively.

5. An active matrix liquid crystal display according to claim 1, wherein each pixel electrode has an extension extended over the gate line corresponding to an adjacent pixel, capacitors for storing the signal voltage to be applied to each pixel are formed by overlapping portions of the pixel electrode and the common electrode, and overlapping portions of the extension of the pixel electrode and the gate line corresponding to the adjacent pixel.

6. An active matrix liquid crystal display according to claim 5, wherein a plurality of common electrodes are formed for each pixel, the free ends of the plurality of common electrodes are interconnected by a connecting electrode to form the capacitor for storing the signal voltage to be applied to the pixel by overlapping portions of the connecting electrode and the pixel electrode.

7. An active matrix liquid crystal display according to claim 5, wherein, the common voltage applied to the common electrode of each pixel is varied in synchronism with the application of the gate voltage to the switching element of the same pixel.

* * * * *

UNITED STATES PATENT AND TRADEMARK OFFICE
CERTIFICATE OF CORRECTION

PATENT NO. : 6,433,764 B1
DATED : August 13, 2002
INVENTOR(S) : Hiroyuki Hebiguchi et al.

It is certified that error appears in the above-identified patent and that said Letters Patent is hereby corrected as shown below:

<u>Title page,</u>
Item [56], U.S. PATENT DOCUMENTS, "4386 352 A", delete "5/1983" and substitute -- 8/1998 -- in its place; "5,250,931 A" delete "10/1993" and substitute -- 8/1998 -- in its place.

Signed and Sealed this

First Day of July, 2003

JAMES E. ROGAN
*Director of the United States Patent and Trademark Office*